(12) United States Patent
Jones et al.

(10) Patent No.: US 12,333,518 B2
(45) Date of Patent: Jun. 17, 2025

(54) REAL-TIME RECONCILIATION PROCESSING BASED ON STRUCTURED MESSAGING DATA

(71) Applicant: The Toronto-Dominion Bank, Toronto (CA)

(72) Inventors: Christopher Mark Jones, Villanova, PA (US); Barry Wayne Baird, Jr., Kennett Square, PA (US); Claude Bernell Lawrence, Jr., Philadelphia, PA (US); Jonathan Joseph Prendergast, West Chester, PA (US)

(73) Assignee: The Toronto-Dominion Bank, Toronto (CA)

( * ) Notice: Subject to any disclaimer, the term of this patent is extended or adjusted under 35 U.S.C. 154(b) by 61 days.

(21) Appl. No.: 17/554,146

(22) Filed: Dec. 17, 2021

(65) Prior Publication Data

US 2022/0198433 A1 Jun. 23, 2022

Related U.S. Application Data

(60) Provisional application No. 63/128,035, filed on Dec. 19, 2020.

(51) Int. Cl.
*G06Q 30/00* (2023.01)
*G06Q 20/02* (2012.01)
*G06Q 20/32* (2012.01)

(52) U.S. Cl.
CPC ......... *G06Q 20/3255* (2013.01); *G06Q 20/02* (2013.01)

(58) Field of Classification Search
CPC .................................................. G06Q 20/3255
(Continued)

(56) References Cited

U.S. PATENT DOCUMENTS 6,029,150 A * 2/2000 Kravitz .................. G06Q 20/12
705/77
7,184,989 B2 2/2007 Hansen et al.
(Continued)

FOREIGN PATENT DOCUMENTS

AU 2013206122 7/2014
CA 3014693 2/2020
(Continued)

OTHER PUBLICATIONS

ProQuestDialogNPL Search History.*
(Continued)

*Primary Examiner* — John H. Holly
(74) *Attorney, Agent, or Firm* — NIXON PEABODY LLP

(57) ABSTRACT

The disclosed embodiments include computer-implemented systems and processes that perform reconciliation processing in real-time based on structured messaging data. For example, an apparatus may receive elements of decomposed message data that include a first parameter value of a data exchange involving first and second counterparties, and that characterize a real-time payment requested from the second counterparty by the first counterparty. The apparatus may transmit a notification to a first device operable by the second counterparty and receive a response to the notification from the first device that includes a second parameter value of the data exchange. Based on at least the first and second parameter values, the apparatus may perform operations that reconcile the response with the elements of decomposed message data, and transmitting data indicative of an outcome of the reconciliation to a second device operable by the first counterparty for presentation within a digital interface.

23 Claims, 10 Drawing Sheets

(58) Field of Classification Search
USPC ......... 705/39, 1.1, 44, 42, 40, 45, 2, 18, 26; 242/434.9, 560.2

See application file for complete search history.

(56) References Cited

U.S. PATENT DOCUMENTS

| | | |
|---|---|---|
| 7,366,694 B2 | 4/2008 | Lazerson |
| 7,487,112 B2 | 2/2009 | Barnes, Jr. |
| 7,555,459 B2 | 6/2009 | Dhar et al. |
| 7,593,889 B2 | 9/2009 | Raines et al. |
| 7,624,070 B2 | 11/2009 | Lebouitz |
| 7,630,933 B2 | 12/2009 | Peterson et al. |
| 7,653,592 B1 | 1/2010 | Flaxman et al. |
| 7,676,425 B1 | 3/2010 | Noles |
| 7,676,431 B2 | 3/2010 | O'Leary et al. |
| 7,680,737 B2 | 3/2010 | Smith, Jr. et al. |
| 7,693,790 B2 | 4/2010 | Lawlor et al. |
| 7,707,055 B2 | 4/2010 | Behmoiras et al. |
| 7,707,107 B2 | 4/2010 | Gebb et al. |
| 7,801,778 B2 | 9/2010 | Fox |
| 7,809,633 B2 | 10/2010 | Nolan, III et al. |
| 7,813,965 B1 | 10/2010 | Robinson et al. |
| 7,827,052 B2 | 11/2010 | Scott et al. |
| 7,844,546 B2 | 11/2010 | Fleishman et al. |
| 7,849,003 B2 | 12/2010 | Egnatios et al. |
| 7,873,543 B2 | 1/2011 | Ferrier et al. |
| 7,899,712 B2 | 3/2011 | May et al. |
| 7,904,306 B2 | 3/2011 | Johnson et al. |
| 7,912,784 B2 | 3/2011 | Sobek |
| 7,970,669 B1 | 6/2011 | Santos |
| 8,156,022 B2 | 4/2012 | Fell et al. |
| 8,249,983 B2 | 8/2012 | Dilip et al. |
| 8,423,403 B2 | 4/2013 | McClung |
| 8,433,648 B2 | 4/2013 | Keithley et al. |
| 8,600,798 B1 | 12/2013 | Corr et al. |
| 8,606,705 B2 | 12/2013 | Zanzot et al. |
| 8,612,339 B2 | 12/2013 | Rose et al. |
| 8,615,426 B2 | 12/2013 | Carlson |
| 8,639,910 B2 | 1/2014 | Karamcheti et al. |
| 8,666,812 B1 | 3/2014 | Gandhi |
| 8,700,484 B2 | 4/2014 | Senior |
| 8,712,912 B2 | 4/2014 | Carlson et al. |
| 8,719,071 B2 | 5/2014 | MacIntyre et al. |
| 8,732,044 B2 | 5/2014 | Lovelett et al. |
| 8,744,899 B2 | 6/2014 | Rose et al. |
| 8,751,387 B2 | 6/2014 | Hougland et al. |
| 8,756,099 B2 | 6/2014 | Keithley et al. |
| 8,788,416 B1 | 7/2014 | Vu |
| 8,799,150 B2 | 8/2014 | Annappindi |
| 8,814,039 B2 * | 8/2014 | Bishop .................. G06Q 20/20 235/379 |
| 9,094,512 B2 | 7/2015 | Sheldon et al. |
| 9,218,618 B2 | 12/2015 | Walker et al. |
| 9,390,410 B2 | 7/2016 | Casares |
| 9,412,118 B2 | 8/2016 | Loomis |
| 9,563,915 B2 | 2/2017 | Brady et al. |
| 9,600,839 B2 | 3/2017 | Calman et al. |
| 9,792,600 B1 | 10/2017 | Grassadonia |
| 9,799,026 B1 | 10/2017 | Allen et al. |
| 9,875,385 B1 | 1/2018 | Humphreys et al. |
| 9,922,324 B2 | 3/2018 | Wilson et al. |
| 9,996,616 B2 | 6/2018 | Grant et al. |
| 10,108,959 B2 | 10/2018 | Wolfs et al. |
| 10,185,936 B2 | 1/2019 | Praisner et al. |
| 10,282,715 B2 | 5/2019 | Brennan et al. |
| 10,290,016 B1 | 5/2019 | Rose |
| 10,354,267 B2 | 7/2019 | Carlson et al. |
| 10,387,881 B2 | 8/2019 | Studnitzer |
| 10,453,062 B2 | 10/2019 | Wolfs et al. |
| 10,529,016 B2 | 1/2020 | Abela et al. |
| 10,535,054 B1 | 1/2020 | Spitzer |
| 10,552,807 B2 | 2/2020 | Marcous et al. |
| 10,558,962 B2 | 2/2020 | Szeto |
| 10,565,630 B2 | 2/2020 | Haceaturean et al. |
| 10,586,236 B2 | 3/2020 | Pourfallah et al. |
| 10,607,284 B2 | 3/2020 | Loganathan et al. |
| 10,643,277 B2 | 5/2020 | Berta et al. |
| 10,679,285 B1 | 6/2020 | Kurani et al. |
| 10,699,289 B1 | 6/2020 | Dalton et al. |
| 10,733,623 B2 | 8/2020 | Ovick et al. |
| 10,740,843 B2 | 8/2020 | Shakkarwar |
| 10,743,149 B2 | 8/2020 | Sewell |
| 10,771,413 B1 | 9/2020 | Heffron |
| 10,776,751 B2 | 9/2020 | Chin |
| 10,783,510 B2 | 9/2020 | George et al. |
| 10,789,580 B2 | 9/2020 | Wolfs et al. |
| 10,789,641 B2 | 9/2020 | Lesandro et al. |
| 10,909,508 B2 | 2/2021 | Fineman et al. |
| 11,468,443 B2 | 10/2022 | Jones et al. |
| 11,727,430 B2 | 8/2023 | Mitchell |
| 2002/0111915 A1 | 8/2002 | Clemens et al. |
| 2004/0138999 A1 | 7/2004 | Friedman et al. |
| 2004/0220873 A1 | 11/2004 | Nolan, III et al. |
| 2005/0004868 A1 | 1/2005 | Klatt et al. |
| 2006/0143124 A1 | 6/2006 | Ehrke |
| 2007/0198407 A1 | 8/2007 | Winter |
| 2007/0265946 A1 | 11/2007 | Schimpf et al. |
| 2007/0288312 A1 | 12/2007 | Wang |
| 2008/0270246 A1 | 10/2008 | Chen |
| 2009/0132410 A1 | 5/2009 | Penney et al. |
| 2009/0164627 A1 | 6/2009 | Bishop et al. |
| 2009/0271224 A1 | 10/2009 | Lange |
| 2010/0057606 A1 | 3/2010 | Louie |
| 2010/0057610 A1 | 3/2010 | Pinkerton |
| 2010/0211499 A1 | 8/2010 | Zanzot et al. |
| 2010/0250407 A1 | 9/2010 | Silva |
| 2011/0099067 A1 | 5/2011 | Cooper et al. |
| 2011/0191173 A1 | 8/2011 | Blackhurst |
| 2012/0036013 A1 | 2/2012 | Neuhaus |
| 2012/0284130 A1 | 11/2012 | Lewis et al. |
| 2013/0066800 A1 | 3/2013 | Falcone et al. |
| 2013/0073386 A1 | 3/2013 | Rose et al. |
| 2013/0073445 A1 | 3/2013 | Meszaros |
| 2013/0138563 A1 | 5/2013 | Gilder et al. |
| 2013/0226789 A1 | 8/2013 | Orttung et al. |
| 2013/0246220 A1 | 9/2013 | Hammad et al. |
| 2014/0025467 A1 | 1/2014 | Nagarahan et al. |
| 2014/0067677 A1 | 3/2014 | Ali et al. |
| 2014/0074688 A1 | 3/2014 | Shvarts |
| 2014/0095638 A1 | 4/2014 | Chen |
| 2014/0172687 A1 | 6/2014 | Chirehdast |
| 2014/0236695 A1 | 8/2014 | Shvarts et al. |
| 2014/0279444 A1 | 9/2014 | Kassemi et al. |
| 2014/0279513 A1 | 9/2014 | Dodds-Brown et al. |
| 2014/0310151 A1 | 10/2014 | Shishkov et al. |
| 2015/0032525 A1 | 1/2015 | Blackhurst et al. |
| 2015/0032538 A1 | 1/2015 | Calman et al. |
| 2015/0073902 A1 | 3/2015 | Soujanya |
| 2015/0100416 A1 | 4/2015 | Blackhurst et al. |
| 2015/0100481 A1 | 4/2015 | Ghosh et al. |
| 2015/0112854 A1 | 4/2015 | Guriel et al. |
| 2015/0170175 A1 | 6/2015 | Zhang et al. |
| 2015/0193873 A1 | 7/2015 | Hammock et al. |
| 2015/0228031 A1 | 8/2015 | Emison et al. |
| 2015/0310490 A1 | 10/2015 | Meredith et al. |
| 2015/0363762 A1 | 12/2015 | Kimberg |
| 2016/0034969 A1 | 2/2016 | Mazurov |
| 2016/0104155 A1 | 4/2016 | McGaugh et al. |
| 2016/0189292 A1 | 6/2016 | Deshpande et al. |
| 2016/0196566 A1 | 7/2016 | Murali et al. |
| 2016/0247177 A1 | 8/2016 | Zamer |
| 2017/0004501 A1 | 1/2017 | Ledford et al. |
| 2017/0161826 A1 | 6/2017 | Packer et al. |
| 2017/0169511 A1 | 6/2017 | Kelly |
| 2017/0193501 A1 | 7/2017 | Cole et al. |
| 2017/0221066 A1 | 8/2017 | Ledford et al. |
| 2017/0270493 A1 | 9/2017 | Lugli et al. |
| 2017/0364878 A1 | 12/2017 | Malhotra et al. |
| 2018/0018661 A1 | 1/2018 | Wade |
| 2018/0096335 A1 | 4/2018 | Moghaizel et al. |
| 2018/0097901 A1 | 4/2018 | Ramachanda |
| 2018/0174116 A1 | 6/2018 | Maenpaa |
| 2018/0181928 A1 | 6/2018 | Woo |
| 2018/0330354 A1 | 11/2018 | Xiu et al. |

(56) References Cited

U.S. PATENT DOCUMENTS

| | | |
|---|---|---|
| 2019/0012645 A1 | 1/2019 | Subramaniam et al. |
| 2019/0043052 A1 | 2/2019 | Ledford et al. |
| 2019/0109915 A1 | 4/2019 | McPhee et al. |
| 2019/0114598 A1 | 4/2019 | Subramaniam et al. |
| 2019/0114666 A1 | 4/2019 | Kohli |
| 2019/0340590 A1 | 11/2019 | Ledford et al. |
| 2019/0378182 A1 | 12/2019 | Weinflash et al. |
| 2020/0014642 A1 | 1/2020 | Sidi et al. |
| 2020/0034813 A1 | 1/2020 | Calinog et al. |
| 2020/0051117 A1 | 2/2020 | Mitchell |
| 2020/0074565 A1 | 3/2020 | Dotter |
| 2020/0104911 A1 * | 4/2020 | Suvajac .................. G06N 3/04 |
| 2020/0160295 A1 | 5/2020 | Jagalpure et al. |
| 2020/0242600 A1 | 7/2020 | Stack et al. |
| 2020/0327529 A1 | 10/2020 | Mukherjee et al. |
| 2020/0349639 A1 | 11/2020 | Mousseau |
| 2020/0364760 A1 | 11/2020 | Sabat et al. |
| 2020/0364784 A1 | 11/2020 | Dill |
| 2020/0387878 A1 | 12/2020 | Jones et al. |
| 2021/0150624 A1 | 5/2021 | Tucker et al. |
| 2022/0044238 A1 | 2/2022 | Jones et al. |
| 2022/0076248 A1 | 3/2022 | Kapoor et al. |
| 2022/0198411 A1 | 6/2022 | Jones et al. |
| 2022/0198417 A1 | 6/2022 | Jones et al. |
| 2022/0198427 A1 | 6/2022 | Jones et al. |
| 2022/0198432 A1 | 6/2022 | Jones et al. |
| 2022/0198445 A1 | 6/2022 | Jones et al. |
| 2022/0198501 A1 | 6/2022 | Jones et al. |
| 2022/0198543 A1 | 6/2022 | Jones et al. |
| 2022/0383301 A1 | 12/2022 | Jones et al. |
| 2022/0383313 A1 | 12/2022 | Jones et al. |
| 2022/0383314 A1 | 12/2022 | Jones et al. |
| 2022/0414656 A1 | 12/2022 | Jones et al. |
| 2023/0055605 A1 | 2/2023 | Jones et al. |
| 2023/0056173 A1 | 2/2023 | Jones et al. |
| 2023/0056764 A1 | 2/2023 | Jones et al. |

FOREIGN PATENT DOCUMENTS

| | | |
|---|---|---|
| CN | 104321738 | 6/2018 |
| IN | 202011016562 | 6/2020 |
| KR | 20060003230 | 1/2006 |
| KR | 20170127418 | 11/2014 |
| KR | 20160140969 | 12/2016 |
| KR | 10-2073974 | 2/2020 |
| WO | WO 2001050370 | 7/2001 |
| WO | WO 2002069290 | 9/2002 |
| WO | WO 2003025712 | 3/2003 |
| WO | WO 2012151571 | 11/2012 |
| WO | WO 2013044286 | 4/2013 |
| WO | WO 2016190810 | 1/2016 |
| WO | WO 2019071263 | 4/2019 |

OTHER PUBLICATIONS

STIC Search Report, Oct. 12, 2023 (4 pages).
STIC Search Report, May 5, 2023 (4 pages).
Quibria, "Introduction to ISO 20022 For U.S. Financial Institutions", NACHA—3 The Electronic Payments Association; 45 pgs. (2015).
Wandhofer et al., "The Future of Correspondent Banking Cross Border Payments", Swift Institute Working Paper No. 2017-01; 63 pgs. (2018).
Rogers, The Definitive Guide to eCommerce Product Reviews (2017).
Khanna, "Venmo'ed: Sharing Your Payment Data with the World," Technology Science, 2018102901, Oct. 28, 2015 (27 pages).
Lochy, "Big Data in the Financial Services Industry—From data to insights", Finextra, 12 pgs. (2019).
Cohen, et al., "Ride on! Mobility business models for the sharing economy," Organization & Environment, 27.3, 2014, pp. 279-296.
FIS, Flavors of Fast, Report; 59 pages (2019).
Infosys, "Global Trends in the Cards and Payments Industry", 40 pgs. (2020).
Sullivan, "Sick of Overdraft Fees? There's an App for that." 8 pgs. (2018).
"POS Financing: There's A Lending Marketplace for That," PYMINTS.com; 19 pgs., (2020).
Target is LIVE with Afterpay.com; 4 pgs., (2021).
"Klama's Marketing Strategy: The Unique Growth Story Behind the Brand," 14 pgs. (2021).

* cited by examiner

| | | |
|---|---|---|
| Requested Delivery Date | 2021-12-14 | — 220 |
| | | |
| Debtor | | |
| Name | Picketts' Construction | |
| Postal Address | | |
| Street Name | Cypress St. | |
| Building Number | 3108 | — 224 |
| Postal Code | 18512 | |
| Town Name | Throop PA | |
| Country | US | |
| | | |
| Debtor Account | | |
| Identification | XXXX-1234-5678-9012 | — 226 |
| | | |
| Amount | | |
| Instructed Amount | 5300.00 | — 222 |
| Currency | USD | |
| | | |
| Creditor | | |
| Name | Davy's Lumber and Supply | |
| Postal Address | | |
| Street Name | Main Street | |
| Building Number | 123 | — 228 |
| Postal Code | 18504 | |
| Town Name | Scranton PA | |
| Country | US | |
| | | |
| Creditor Account | | |
| Identification | XXXX-9012-3456-7890 | — 230 |
| | | |
| Remittance Information | | |
| Unstructured | http://www.DCrocLumberSupply.com/receipt?custid='3108'?zip='18512' | — 234 |

REAL-TIME RECONCILIATION PROCESSING BASED ON STRUCTURED MESSAGING DATA

CROSS-REFERENCE TO RELATED APPLICATION

This application claims the benefit of priority to U.S. Provisional Patent Application No. 63/128,035, filed on Dec. 19, 2020, the entire disclosure of which is expressly incorporated herein by reference to its entirety.

TECHNICAL FIELD

The disclosed embodiments generally relate to computer-implemented systems and processes that perform reconciliation processing in real-time based on structured messaging data.

BACKGROUND

Today, the mass adoption of smart phones and digital payments within the global marketplace drives an increasingly rapid adoption of real-time payment (RTP) technologies by financial institutions, consumers, vendors and merchants, and other participants in the payment ecosystem. RTP technologies emphasize data, messaging, and global interoperability and in contrast to many payment rails, such as those that support credit card payments, embrace the near ubiquity of mobile technologies in daily life.

SUMMARY

In some examples, an apparatus include a communications interface, a memory storing instructions, and at least one processor coupled to the communications interface and to the memory. The at least one processor is configured to execute the instructions to obtain elements of decomposed message data. The elements of decomposed message data include a first value of a parameter of an exchange of data involving a first counterparty and a second counterparty, and the elements of decomposed message data characterize a real-time payment requested from the second counterparty by the first counterparty. The at least one processor is configured to execute the instructions to, via the communications interface, transmit a notification associated with the data exchange to a first device operable by the second counterparty and receive a response to the notification from the first device. The response includes a second value of the parameter of the data exchange. The at least one processor is configured to execute the instructions to, based on at least the first and second parameter values, perform operations that reconcile the response with the elements of decomposed message data, and transmit, via the communications interface, data indicative of an outcome of the reconciliation to a second device operable by the first counterparty. The second device is configured to present at least a portion of the outcome data within a digital interface.

In other examples, a computer-implemented method includes obtaining elements of decomposed message data using at least one processor. The elements of decomposed message data include a first value of a parameter of an exchange of data involving a first counterparty and a second counterparty, and the elements of decomposed message data characterize a real-time payment requested from the second counterparty by the first counterparty. The computer-implemented method includes, using the at least one processor, transmitting a notification associated with the data exchange to a first device operable by the second counterparty and receiving a response to the notification from the first device. The response includes a second value of the parameter of the data exchange. The computer-implemented method includes, based on at least the first and second parameter values, performing operations, using the at least one processor, that reconcile the response with the elements of decomposed message data, and transmitting, using the at least one processor, data indicative of an outcome of the reconciliation to a second device operable by the first counterparty. The second device is configured to present at least a portion of the outcome data within a digital interface.

Further, in some examples, a tangible, non-transitory computer-readable medium storing instructions that, when executed by at least one processor, cause the at least one processor to perform a method that includes obtaining elements of decomposed message data. The elements of decomposed message data includes a first value of a parameter of an exchange of data involving a first counterparty and a second counterparty, and the elements of decomposed message data characterize a real-time payment requested from the second counterparty by the first counterparty. The method includes transmitting a notification associated with the data exchange to a first device operable by the second counterparty and receiving a response to the notification from the first device. The response includes a second value of the parameter of the data exchange. The method includes, based on at least the first and second parameter values, performing operations that reconcile the response with the elements of decomposed message data, and transmitting data indicative of an outcome of the reconciliation to a second device operable by the first counterparty. The second device is configured to present at least a portion of the outcome data within a digital interface.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIG. 2B illustrates portions of an exemplary request for payment (RFP), in accordance with some exemplary embodiments.

Like reference numbers and designations in the various drawings indicate like elements.

DETAILED DESCRIPTION

Figure 1:
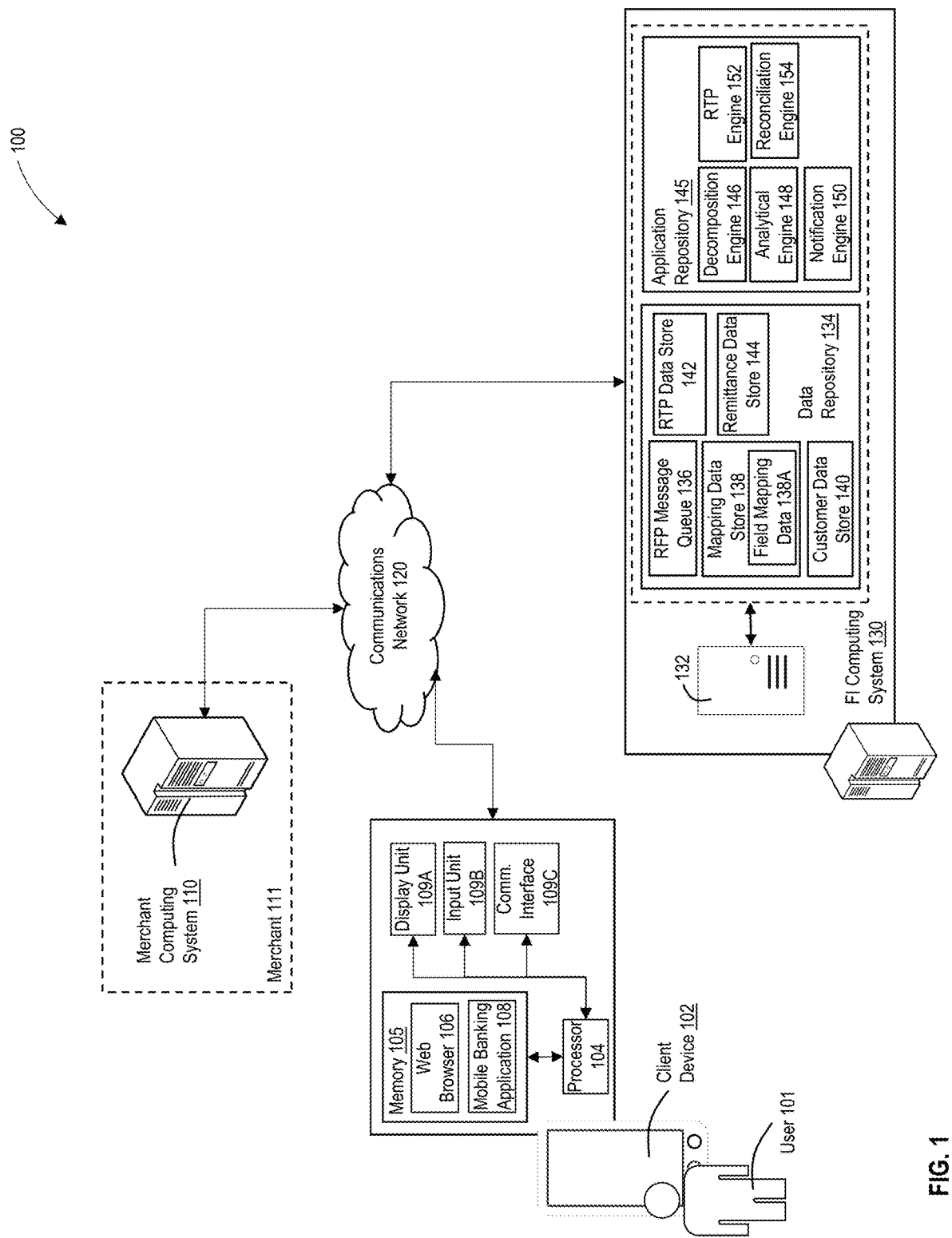
FIG. 1 is a block diagram of an exemplary computing environment, in accordance with some exemplary embodiments.

The mass adoption of smart phones and digital payments within the global marketplace drives an adoption of RTP technologies by financial institutions, consumers, vendors and merchants, and other participants in the payment ecosystem. These RTP technologies often emphasize data, messaging, and global interoperability and in contrast to conventional payment rails, may embrace the near ubiquity of mobile technologies in daily life to provide, to the participants in the RTP ecosystem, real-time service and access to funds. To facilitate the strong emphasis on data, messaging, and global interoperability between financial institutions, many RTP technologies adopt, and exchange data formatted in accordance with, one or more standardized data-exchange protocols, such as the ISO 20022 standard for electronic data exchange between financial institutions.

For example, a customer of a financial institution may initiate a transaction to purchase one or more products or services from a merchant or retailer, either through in-person interaction at a physical location of the merchant or retailer, or through digital interactions with a computing system of the merchant (e.g., via a web page or other digital portal). In some instances, and to fund the initiated purchase transaction, the customer may provide the merchant with data characterizing a payment instrument, such as credit card account issued by the financial institution (e.g., via input provisioned to the web page or digital portal, or based on an interrogation of a physical payment card by point-of-sale terminal, etc.). The merchant computing system may perform operations that generate elements of messaging data that identify and characterize the merchant and the initiated purchase transaction, that include portions of the data characterizing the payment instrument, and that submit the generated elements of messaging data to a transaction processing network or payment rail in accordance with a predetermined schedule, e.g., in batch form with other elements of messaging data at a predetermined time on a daily basis. In some instances, one or more computing systems of the transaction processing network or payment rail may perform operations that execute, clear, and settle the initiated purchase transaction involving the payment instrument within a predetermined temporal interval subsequent to the initiation of the purchase transaction, such as, but not limited to, forty-eight hours.

In other examples, the merchant and the financial institution of the customer may represent participants in the RTP ecosystem, and the merchant computing system (or a computing system associated with a financial institution of the merchant) may generate a message, e.g., a Request for Payment (RFP) message, that requests a real-time payment from the customer that funds the initiated purchase transaction, and may transmit that message to one or more computing systems of the financial institution of the customer, e.g., directly or through one or more intermediate systems associated with the RTP ecosystem, such as a clearinghouse system. The generated and transmitted RFP message may, for example, be formatted in accordance with the ISO 20022 data-exchange format, and may include message fields populated with information that includes, but is not limited to, information identifying the customer and the merchant, information characterizing the requested payment (e.g., a requested payment amount, a requested payment date, an identifier of an account selected by the customer to fund the requested, real-time payment, or an identifier of an account of the merchant capable of receiving the requested, real-time payment, etc.) and information characterizing the initiated purchase transaction (e.g., a transaction date or time, or an identifier of one or more of the products or services involved in the initiated purchase transaction, such as a corresponding UPC, etc.). Further, the ISO-20022-compliant RFP message may also include a link within a structured or unstructured message field to information, such as remittance data, associated with the requested, real-time payment (e.g., a long- or shortened Uniform Resource Location (URL) pointing to a formatted invoice or statement that includes any of the information described herein).

In some examples, the elements of structured or unstructured data maintained within the message fields of exemplary, ISO-20022-compliant RFP messages described herein may extend beyond the often-limited content of the message data transmitted across many existing payment rails and transaction processing networks. Further, when intercepted and processed by a computing system of the financial institution of the customer (e.g., an FI computing system), these elements of structured or unstructured RFP message data may be processed by the FI computing system to determine, among other things, one or more RTP messages associated with one or more RFP messages, to reconcile an RFP message with the one or more RTP messages, and to provision data characterizing the reconciliation process to update an accounting or inventory-management application.

By way of example, and using any of the exemplary, computer-implemented processes described herein, the FI computing system, based on elements of structured or unstructured message data characterizing an exchange of data initiated between a first counterparty and a second counterparty, may automatically reconcile one or more RFP messages issued by a customer (e.g., a merchant or business owner) of a financial institution to corresponding counterparties (e.g., customers of the merchant or business owner) with corresponding elements of remittance advice received by a computing system of the financial institution in conjunction with each of the counterparties' payments. In some instances, certain of the exemplary, computer-implemented processes described herein may, based on the outcome of the reconciliation process, access a programmatic interface of an accounting or inventory management application executed by a computing device of the small-business customer, and generate and transmit messages that automatically update the executed accounting or inventory-management application with data that characterizes the outcome of the reconciliation process. Further, and based on an outcome of the reconciliation process, the FI computing system may perform operations that update account data of the small-business customer to reflect the reconciled payments, and may render funds associated with these reconciled payments available to the small-business customer.

Certain of these exemplary embodiments, which decompose the structured message fields of an ISO-20022-compliant RFP message to obtain elements of decomposed message data characterizing the customer, the merchant, the initiated purchase transaction, and the requested, real-time payment, analyze the elements of decomposed message data to facilitate a programmatic, real-time reconciliation of requested and received payments by the FI computing system without merchant involvement. Further, additional ones of the exemplary embodiments described enable the FI computing system to provision updates to an accounting or inventory-management application executed at the customer device that not only identify each of the requested and received payments, but also characterize an outcome of the reconciliation process, and as such, mitigate occurrences of the errors and omissions characteristic of many manual interactions between the small-business customers and corresponding accounting or inventory-management applications. The FI computing system may implement these exemplary processes in addition to, or as an alternate to, many processes that relay on the often-limited content of temporally delayed message data transmitted across many existing payment rails and transaction processing networks.

A. Exemplary Computing Environments

FIG. 1 is a diagram illustrating an exemplary computing environment 100 that includes, among other things, one or more computing devices, such as a client device 102, and one or more computing systems, such as a merchant computing system 110 and a financial institution (FI) system 130, each of which may be operatively connected to, and interconnected across, one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Client device 102 may include a computing device having one or more tangible, non-transitory memories, such as memory 105, that store data and/or software instructions, and one or more processors, e.g., processor 104, configured to execute the software instructions. The one or more tangible, non-transitory memories may, in some aspects, store application programs, application engines or modules, and other elements of code executable by the one or more processors, such as, but not limited to, an executable web browser 106 (e.g., Google Chrome™, Apple Safari™, etc.), and additionally or alternatively, an executable application associated with FI computing system 130 (e.g., mobile banking application 108). In some instances, not illustrated in FIG. 1, memory 105 may also include one or more structured or unstructured data repositories or databases, and client device 102 may maintain one or more elements of device data within the one or more structured or unstructured data repositories or databases. For example, the elements of device data may uniquely identify client device 102 within computing environment 100, and may include, but are not limited to, an Internet Protocol (IP) address assigned to client device 102 or a media access control (MAC) layer assigned to client device 102.

Client device 102 may include a display unit 109A configured to present interface elements to a corresponding user, such as a user 101, and an input unit 109B configured to receive input from user 101, e.g., in response to the interface elements presented through display unit 109A. By way of example, display unit 109A may include, but is not limited to, an LCD display unit or other appropriate type of display unit, and input unit 109B may include, but is not limited to, a keypad, keyboard, touchscreen, voice activated control technologies, or appropriate type of input unit. Further, in additional aspects (not illustrated in FIG. 1), the functionalities of display unit 109A and input unit 109B may be combined into a single device, e.g., a pressure-sensitive touchscreen display unit that presents interface elements and receives input from user 101. Client device 102 may also include a communications interface 109C, such as a wireless transceiver device, coupled to processor 104 and configured by processor 104 to establish and maintain communications with communications network 120 via one or more communication protocols, such as WiFi®, Bluetooth®, NFC, a cellular communications protocol (e.g., LTE®, CDMA®, GSM®, etc.), or any other suitable communications protocol.

Examples of client device 102 may include, but not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface device or unit, such as display unit 109A. In some instances, client device 102 may also establish communications with one or more additional computing systems or devices operating within environment 100 across a wired or wireless communications channel, e.g., via the communications interface 109C using any appropriate communications protocol. Further, user 101 may operate client device 102 and may do so to cause client device 102 to perform one or more exemplary processes described herein.

Merchant computing system 110 and FI computing system 130 may each represent a computing system that includes one or more servers and one or more tangible, non-transitory memory devices storing executable code, application engines, or application modules. Each of the one or more servers may include one or more processors, which may be configured to execute portions of the stored code, application engines or modules, or application programs to perform operations consistent with the disclosed exemplary embodiments. For example, as illustrated in FIG. 1, the one or more servers of FI computing system 130 may include server 132 having one or more processors configured to execute portions of the stored code, application engines or modules, or application programs maintained within the one or more tangible, non-transitory memories.

In some instances, merchant computing system 110 and/or FI computing system 130 may correspond to a discrete computing system, although in other instances, merchant computing system 110 or FI computing system 130 may correspond to a distributed computing system having multiple, computing components distributed across an appropriate computing network, such as communications network 120 of FIG. 1A, or those established and maintained by one or more cloud-based providers, such as Microsoft Azure™, Amazon Web Services™, or another third-party, cloud-services provider. Further, each of merchant computing system 110 and FI computing system 130 may also include one or more communications interfaces, such as one or more wireless transceivers, coupled to the one or more processors for accommodating wired or wireless internet communication across network 120 with other computing systems and devices operating within environment 100 (not illustrated in FIG. 1).

By way of example, merchant computing system 110 may be associated with, or operated by, a merchant 111 that offers products or services for sale, either on a retail or a wholesale basis, to one or more customers, such as, but not limited to, user 101 that operates client device 102. Further, and as described herein, FI computing system 130 may be associated with, or operated by, a financial institution that offers financial products or services to one or more customers, such as, but not limited to, user 101 and/or merchant 111. The financial products or services may, for example, include a payment instrument issued to user 101 by the financial institution and available to fund the initiated purchase transaction, and examples of the payment instrument may include, but are not limited to, a credit card account issued by the financial institution or a checking, savings, or other deposit account issued by and maintained at the financial institution.

In some instances, FI computing system 130 may perform any of the exemplary processes described herein to obtain, receive, or intercept a request-for-payment (RFP) message associated with the initiated purchase transaction between a first counterparty (e.g., merchant 111 of FIG. 1) and a second counterparty (e.g., user 101 of FIG. 1). As described herein, the received RFP message may be formatted and structured in accordance with one or more standardized data-exchange protocols, such as the ISO 20022 standard for electronic data exchange between financial institutions. Further, and based on elements of mapping data that characterize a structure, composition, or format of one or more data fields of the ISO-20002-compliant RFP message, FI computing system 130 may perform any of the exemplary processes described herein to decompose the received RFP message and obtain data characterizing user 101, merchant 111, and the initiated purchase transaction, and the requested payment. Further, and in some instances, based on the data of the decomposed RFP message, FI computing system 130 may perform any of the exemplary processes described herein to reconcile the requested and received payments associated with the one or more elements of the decomposed RFP message data.

To facilitate performance of one or more of these exemplary processes, FI computing system 130 may maintain, within the one or more tangible, non-transitory memories, a data repository 134 that includes, but is not limited to, a request-for-payment (RFP) message queue 136, a mapping data store 138, a customer data store 140, RTP data store 142, and a remittance data store 144. RFP message queue 136 may include one or more discrete RFP messages received by FI computing system 130 using any of the exemplary processes described herein. In some instances, the RFP messages maintained within RFP message queue 136 may be prioritized in accordance with a time or date of receipt by FI computing system 130 or with requested payment data associated with each of the RFP messages, and each of the prioritized RFP messages may be associated with a corresponding temporal pendency. Further, FI computing system 130 may perform any of the exemplary processes described herein to provision elements of notification data associated with each of the prioritized RFP message to a computing system or device associated with a corresponding customer (e.g., client device 102 associated with user 101), and FI computing system 130 may perform operations that maintain each of the prioritized RFP messages within RFP message queue 136 until a receipt, at FI computing system 130, of confirmation data from corresponding ones of the computing systems or devices indicating an approval, partial approval, or a rejection, of the corresponding requested payment, or until an expiration of the corresponding pendency period.

Mapping data store 138 may include structured or unstructured data records that maintain one or more elements of field mapping data 138A. For example, and as described herein, FI computing system 130 may receive, obtain, or intercept one or more RFP messages, each of which may be formatted and structured in accordance with a corresponding, standardized data-exchange protocol, such as the ISO 20022 standard for electronic data exchange between financial institutions. In some instances, the one or more elements of field mapping data 138A may characterize a structure, composition, or format of the message data populating one or more data fields of the ISO-20002-compliant RFP message, or a corresponding RFP message compliant with an additional, or alternate, standardized data-exchange protocol. In some instances, customer data store 140 may include structured or unstructured data records that maintain information identifying and characterizing one or more customers of the financial institution, and further, interactions between these customers and not only the financial institution, but also other unrelated third parties, such as the merchants or retailers described herein.

RTP data store 142 may include one or more elements of decomposed field data generated through a decomposition of corresponding ones of the received RFP messages, e.g., based on the elements of field mapping data 138A and through an implementation of any of the exemplary processes described herein. In some instances, the elements of decomposed field data maintained within RTP data store 142 may establish a time-evolving record of real-time payment transactions initiated by, or involving, the individual and small-business customers during a current temporal interval and across one or more prior temporal intervals, and across various merchant classifications or geographic region. Further, remittance data store 144 may include structured or unstructured data records 142A that identify and characterize discrete elements of remittance data that characterize an approval, a partial approval, or a rejection of a payment requested by the business associated with the one or more RFP messages.

Further, and to facilitate the performance of any of the exemplary processes described herein, FI computing system 130 may also maintain, within the one or more tangible, non-transitory memories, an application repository 145 that maintains, among other things, a decomposition engine 146, an analytical engine 148, a notification engine 150, an RTP engine 152, and a reconciliation engine 154, each of which may be executed by the one or more processors of server 132. For example, and upon execution by the one or more processors of server 132, executed decomposition engine 146 may perform any of the exemplary processes described herein to obtain field mapping data 138A from mapping data store 138, to apply field mapping data 138A to a received, obtained, or intercepted RFP message, and based on the application of field mapping data 138A to the RFP message, to decompose the RFP message and obtain elements of message data that not only identify and characterize each counterparty involved in an initiated purchase transaction (e.g., user 101 and merchant 111, described herein), but that also characterize the initiated purchase transaction. Further, and upon execution by the one or more processors of server 132, executed analytical engine 148 may perform any of the exemplary processes described herein to process the elements of message data obtained from the message fields of the decomposed RFP message, and obtain additional data identifying or characterizing one or more of the counterparties to the purchase transaction and additionally, or alternatively, a product or service involved in the purchase transaction.

Upon execution by the one or more processors of FI computing system 130, notification engine 150 may perform any of the exemplary processes described herein to generate one or more elements of a payment notification that, when provisioned to client device 102 by FI computing system 130, cause one or more application programs executed by client device 102 to present interface elements within a corresponding digital interface that prompt user 101 to provide an approval, partial approval, or rejection of the real-time payment requested by merchant 111 via the RFP message, e.g., contemporaneously with the initiation of the purchase transaction. Further, in some examples, executed notification engine 150 may perform any of the exemplary processes described herein to provision updates to one or more application programs executed at the merchant computing system 110, such as, but not limited to, an executed accounting or inventory-management application, that not only identify each of the requested and received payments, but also characterize an outcome of a corresponding reconciliation process.

Further, in some examples, executed notification engine 150 may also perform any of the exemplary processes described herein to provide, to merchant computing system 110, data characterizing an analysis of cash and/or inventory flow in real time and contemporaneously with the initiation of the purchase transactions, and data characterizing a real-time availability of funds associated with reconciled, real-time payments. In some examples, upon execution by the one or more processors of FI computing system 130, RTP engine 152 may perform any of the exemplary processes described herein to execute a real-time payment requested from user 101 by merchant 111 based on, and responsive to, data indicating an approval of the requested, real-time payment by user 101 and in accordance with elements of decomposed field data obtained from, or derived from, the message fields of a corresponding RFP message.

II. Computer-Implemented Techniques for Performing Real-Time Reconciliation Processing Based on Structured Messaging Data As described herein, a customer of the financial institution, such as user 101, may elect to initiate a purchase of one or more products or services from a particular merchant, such as merchant 111. By way of example, merchant 111 may be a local lumberyard (e.g., "Davy's Lumber and Supply"), and user 101 (e.g., "Picketts' Construction") may engage the local lumberyard to place a first order to purchase building materials for an ongoing construction project, in accordance with an agreed-upon price (e.g., US $5,300.00 for the building materials) and to be delivered at or before predetermined date (e.g., on or before Dec. 21, 2021). In some instances, merchant 111 may deliver the building materials on Dec. 14, 2021, and upon completion of the delivery, an application program 202 executed by merchant computing system 110, such as, but not limited to, an accounting application or an inventory-management application, may perform operations that generate, and store within a locally accessible data repository, data associated with a customer invoice that, among other things, identifies the customer (e.g., a name or address of user 101, etc.), the local lumberyard (e.g., a name, address, or phone number of merchant 111), each of the building materials provided in the delivery, unit costs associated with each of the purchased building materials, and aggregate costs associated with the delivered materials. In some instances, merchant computing system 110 may perform any of these exemplary processes to generate, and store within the locally accessible data repository, the customer invoice data at or during any temporal period, such as, but not limited to, upon delivery of the products or completion or service, upon placing the order for the products or service, or another time agreeable to merchant 111 and user 101

Figure 2A:
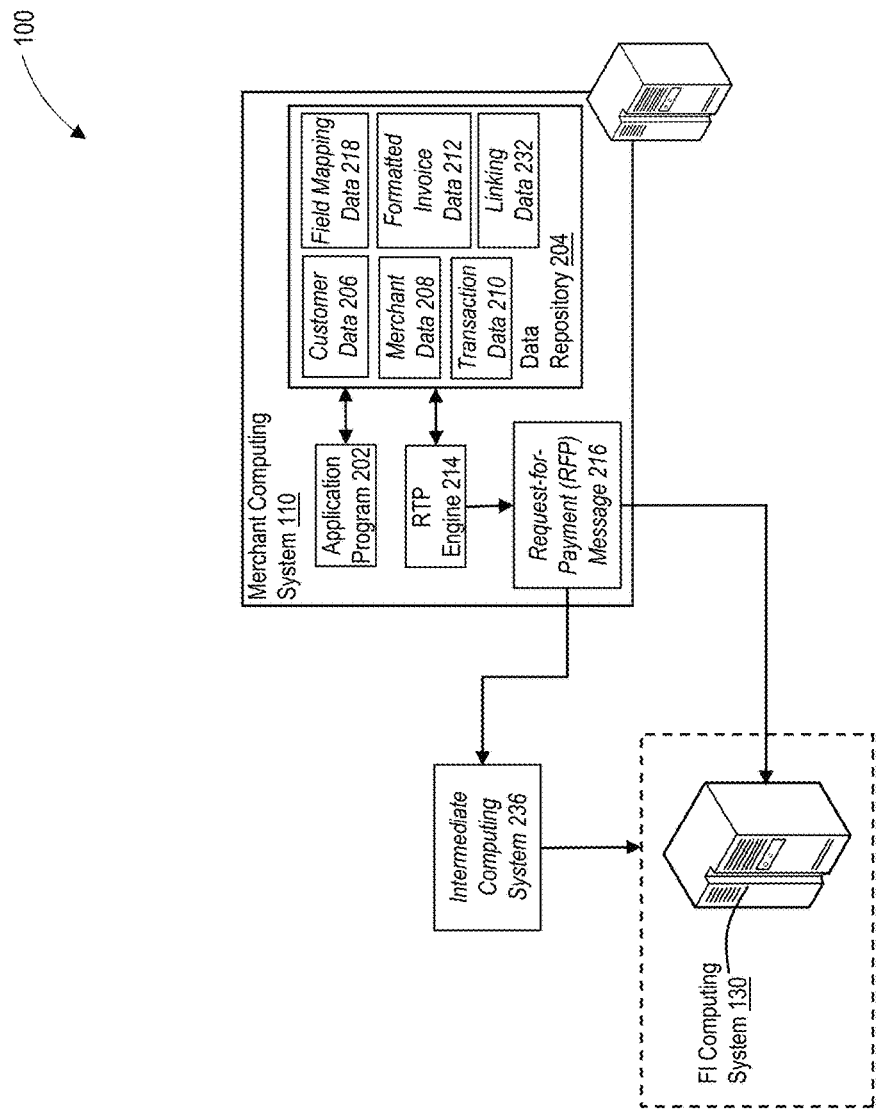
FIG. 2A is a block diagram illustrating a portion of an exemplary computing environment, in accordance with some exemplary embodiments.

Referring to FIG. 2A, and upon execution by the one or more processors of merchant computing system 110, executed application program 202 may perform operations that access a data repository 204 (e.g., as maintained within the one or more tangible, non-transitory memories of merchant computing system 110), and obtain one or more elements of customer data 206, which identify and characterize user 101, one or more elements of merchant data 208, which identify and characterize merchant 111, and one or more elements of transaction data 210, which identify and characterize each of the purchased building materials, the unit costs associated with the purchased building materials, and the aggregate costs for the delivered building materials.

By way of example, the elements of customer data 206 may include, among other things, a unique customer identifier associated with user 101 (e.g., an alphanumeric character string assigned to user 101 by merchant computing system 110, etc.), a full name of user 101 (e.g., "Picketts' Construction"), and a postal address of user 101 ("3108 Cypress St. Throop, PA, 18512, US"). Further, in some examples, the elements of customer data 206 may also include customer account information that identifies a payment instrument held by user 101 and capable of funding the delivered building materials. Examples of the payment instrument held by user 101 may include, but are not limited to, a deposit account (e.g., a checking or savings account, etc.) or a credit-card account issued to user 101 by a corresponding financial institution (e.g., the financial institution associated with FI computing system 130), and the information that identifies the payment instrument may include, but is not limited to, all or a portion of a corresponding account number (e.g., an actual or tokenized account number) and in some instances, a corresponding expiration data and/or corresponding card verification code (e.g., associated with a credit-card account), or a corresponding routing number (e.g., associated with a deposit account). Further, in some instances, user 101 may provision the customer account information to merchant 111 prior to an initiation of the delivery, e.g., to provide a deposit or partial payment on a purchase of one or more building materials associated with the delivery.

The elements of merchant data 208 may include, among other things, a business name of merchant 111 (e.g., "Davy's Lumber and Supply"), a business address of merchant 111 (e.g., "123 Main Street, Scranton, PA, 18504"), and contact information for merchant 111 (e.g., a telephone number, an email address, etc.). Further, in some instances, the elements of merchant data 208 may also include merchant account information that identifies a merchant account held by merchant 111 and configured to receive proceeds from one or more purchase transactions involving corresponding counterparties, such as, but not limited to, the purchase of the building materials by user 101. For example, the merchant account held by merchant 111 may include, but is not limited to, a deposit account, such as a checking account, issued to merchant by a corresponding financial institution (e.g., the financial institution associated with FI computing system 130, an additional, unrelated financial institution, etc.). As described herein, the merchant account information may include all or a portion of a corresponding account number (e.g., an actual or tokenized account number) and/or a corresponding bank routing number.

Further, in some instances, the elements of transaction data 210 may include, but are not limited to, an identifier of each of the building materials associated with, and involved in, the first order, and unit costs associated with corresponding ones of the building materials. By way of example, the building materials may include forty standard sized sheets of plywood, five rolls of roof underlayment, and 100 bundles of roofing shingles, and the elements of transaction data may include, among other things: (i) a quantity of the standard sheets of plywood purchased to provision the delivery (e.g., forty sheets of plywood), a universal product code (UPC) or other unique identifier of the provisioned 40 standard sized sheets of plywood, and a total cost associated with the purchased sheets of plywood (e.g., $1,200.00); (ii) a quantity of the rolls of roof underlayment to provision the delivery (e.g., five rolls), a UPC or other unique identifier of the provisioned five rolls of roof underlayment, and a total cost associated with the purchased roof underlayment (e.g., $700.00); and (iii) a quantity of the bundles of roofing shingles (e.g., 100 bundles) to provision the delivery, a UPC or other unique identifier of the provisioned bundles of roofing shingles, and a total cost associated with the purchased shingles (e.g., $3,100.00). The elements of transaction data 210 may also include a subtotal for the building materials involved in the delivery (e.g., $5,000.00), an amount of imposed sales tax on the purchased building materials (e.g., $300.00), and a total cost of the building materials (e.g., $5,300.00). The elements of transaction data 210 may also, in some instances, specify a date (e.g., Dec. 21, 2021) by which merchant 111 requests a payment from user 101 in the amount of the total, $5,300.00 cost of the ordered building materials.

Referring back to FIG. 2A, executed application program 202 may perform operations that process the elements of customer data 206, merchant data 208, and transaction data 210, and that generate invoice data characterizing an invoice for the building materials that, among other things, identifies user 101 and merchant 111, a postal address of merchant 111, and/or the purchased building materials. The generated invoice data may be structured in accordance with one or more standardized document formats, such as a PDF format, an HTML format, or an XML format, and in some instances, executed application program 202 may generate one or more elements of formatted invoice data 212 that identify merchant 111 (e.g., "Davy's Lumber and Supply"), a postal address associated with merchant 111 (e.g., "123 Main Street, Scranton, Pennsylvania, 18504"), user 101 (e.g., "Pickett's Construction"), and the postal address of user 101 ("3108 Cypress St., Throop, Pennsylvania, 18504, US").

The elements of formatted invoice data 212 may also include portions of transaction data 210 that identify the purchased building materials (e.g., the UPCs of the purchased sheets of plywood, rolls of roof underlayment, and bundles of roofing shingles), the total costs of the purchased building materials (e.g., the $1,200.00 cost for the purchased sheets of plywood, the $700.00 cost of the purchased roof underlayment, the $3,100.00 cost of the bundles of roof shingles), and the aggregate costs for the now-delivered building materials (e.g., the $5,000.00 subtotal, the $300.00 in imposed taxes, and the total cost of $5,300.00). As illustrated in FIG. 2A, executed application program 202 may perform operations that store the elements of formatted invoice data 212, which collectively establish the invoice for the building materials, within a corresponding portion of a tangible, non-transitory memory, such as within a portion of data repository 204.

In some examples, merchant 111 may elect to present the generated invoice to user 101 for payment, e.g., in physical form to user 101 or in digital form via one or more messages exchanged between merchant computing system 110 and client device 102. User 101 may, for example, provision information associated with the requested payment, including an account number and/or a bank routing number associated with a corresponding payment instrument to merchant 111 (e.g., via merchant computing system 110), and merchant computing system 110 may perform operations that broadcast data characterizing the transaction and the payment across network 120 to one or more computing systems associated with a transaction-processing network or payment rail, e.g., for clearance and settlement using one or more conventional payment clearance and settlement protocols.

In other instances, one or more application programs executed by merchant computing system 110, such as RTP engine 214 of FIG. 2A, may perform any of the exemplary RTP processes described herein, which, in conjunction with one or more computing systems operating within environment 100 (such as, but not limited to, FI computing system 130), enable merchant 111 to request, and to receive, a payment for the building materials in real-time and contemporaneously with the provisioning of the building materials (e.g., upon delivery of the building materials). By way of example, upon execution by the one or more processors of merchant computing system 110, executed RTP engine 214 may perform operations that access data repository 204, and obtain one or more of the elements of customer data 206, merchant data 208, and transaction data 210 maintained locally within data repository 204. Based on portions of the obtained elements of customer data 206, merchant data 208, and transaction data 210, executed RTP engine 214 may perform any of the exemplary processes described herein to generate a request-for-payment (RFP) message 216 that is structured and formatted in accordance with the one or more elements of field mapping data 218 and that requests a payment from user 101 for the building materials (e.g., the total cost of $5,300.00) in real-time and contemporaneously with the provisioned building materials (e.g., upon delivery of the building materials to the construction site of user 101). As described herein, RFP message 216 may be structured in accordance with the ISO 20022 standard for electronic data exchange between financial institutions, and in some examples, RFP message 216 may correspond to a pain.013 message as specified within the ISO 20022 standard. Further, and as described herein, the one or more elements of field mapping data 218 may characterize a structure, composition, or format of one or more data fields of ISO-20002-compliant RFP message 216 (e.g., the one or more data fields within the pain.013 message).

By way of example, ISO-20022-compliant RFP message 216 may include, among other things: (i) message fields populated with data specifying a customer name and postal address of user 101; (ii) message fields populated with data identifying the payment instrument held by user 101 and capable of funding the requested payment (iii) message fields populated with data specifying a merchant name and postal address of merchant 111; (iv) message fields populated with data identifying the merchant account held by merchant 111 and available to receive proceeds from the requested payment; and (v) message fields populated with one or more parameter values that characterize the purchase of the building materials, a requested payment method, and/or a requested payment date. Further, ISO-20022-compliant RFP message 216 may also include one or more structured or unstructured message fields that specify additional information associated with the initiated purchase transaction.

Examples of the additional information include, but are not limited to, information identifying the purchased building materials involved in the initiated transaction and/or a link to remittance data associated with the initiated transaction (e.g., a link to a PDF or HTML invoice for the building materials). In some instances, as described herein, the link may include a long-form uniform resource locator (URL) into which certain of the elements of customer data 206, merchant data 208, or transaction data 210 may be embedded, such as, but not limited to, the postal code of merchant 111 or the unique customer identifier associated with user 101. In other instances, the link may include a shortened URL, such as a tiny URL, actionable by FI computing system 130 using any of the exemplary processes described herein.

In some instances, executed RTP engine 214 may parse the elements of customer data 206, merchant data 208, and transaction data 210, and may populate the message fields of RFP message 216 with corresponding ones of the elements of customer data 206, merchant data 208, and transaction data 210 in accordance with field mapping data 218. For example, executed RTP engine 214 may parse the elements of formatted invoice data 212 and obtain the requested payment date (e.g., Dec. 14, 2021), a requested payment amount (e.g., the U.S. $5,300.00 total cost of the building materials), and additionally, or alternatively, a currency associated with that requested payment amount (e.g., U.S. dollars). Executed RTP engine 214 may also format the requested payment date, the requested payment amount, and the requested payment currency in accordance with portions of field mapping data 218. As illustrated in FIG. 2B, executed RTP engine 214 may perform operations that populate message field 220 of RFP message 216 with the formatted payment date (e.g., "2021-12-21") and message fields 222 of RFP message 216 with respective ones of the formatted payment amount (e.g., "5,300.00") and formatted payment currency (e.g., "USD").

Executed RTP engine 214 may further parse the elements of customer data 206 to obtain the customer name of user 101 (e.g., "Picketts' Construction") and the postal address (e.g., "3108 Cypress St., Throop, Pennsylvania, 18512, U.S.") associated with user 101. Additionally, in some instances, executed RTP engine 214 may also parse the elements of customer data 206 to obtain customer account information that identifies the payment instrument capable of funding the aggregate costs of the building materials, such as, but not limited to, all or a portion of a tokenized or actual account number (e.g., "XXXX-1234-5678-9012") and/or a bank routing number (e.g., "123456789"). In some instances, executed RTP engine 214 may format the obtained customer name, the obtained customer address, additionally, or alternatively, portions of the customer account information in accordance with portions of field mapping data 218. For example, as illustrated in FIG. 2B, executed RTP engine 214 may perform operations that populate message fields 224 of RFP message 216 with respective portions of the formatted customer name and customer address, and that populate message field 226 with the portions of the tokenized account number of the payment instrument.

Executed RTP engine 214 may also parse the elements of merchant data 208 to obtain the merchant name of merchant 111 (e.g., "Davy's Lumber and Supply"), the postal address (e.g., "123 Main Street, Scranton, Pennsylvania, 18519, U.S.") associated with merchant 111, and merchant account information that identifies merchant account held by merchant 111 and capable of receiving proceeds from the requested payment. As described herein, examples of the merchant account information include, but are not limited to, all or a portion of a tokenized or actual account number (e.g., "XXXX-9012-3456-7890") and/or a bank routing number (e.g., "987564231"). In some instances, executed RTP engine 214 may format the obtained merchant name, the obtained merchant address, and portions of the merchant account information in accordance with portions of field mapping data 218, and as illustrated in FIG. 2B, executed RTP engine 214 may perform operations that populate message fields 228 of RFP message 216 with respective portions of the formatted merchant name and merchant address, and that populate message field 230 with the formatted portions of the merchant account information.

Further, and as described herein, RFP message 216 may also include one or more message fields that specify remittance information associated with requested payment, such as, but not limited to, a link to the PDF or HTML invoice associated with the ordered building materials. By way of example, executed RTP engine 214 may access the one or more elements of formatted invoice data 212 maintained within data repository 204, and may perform operations that generate corresponding elements of linking data 232 that include, among other things, a long-form or shortened URL associated with the stored elements of formatted invoice data 212 (e.g., that point to the storage location of formatted invoice data 212 within data repository 204).

In some instances, executed RTP engine 214 may perform operations that obtain linking data 232 from data repository 204, and that process and package all, or a selected portion, of linking data 232 within a corresponding unstructured message field of RFP message 216. For example, linking data 232 may include a long-form URL (e.g., http://www.DCrocLumberSupply.com/receipt?custid='3108'?zip='18512') that points to formatted invoice data 212 maintained within data repository 204 and includes the actual postal code (e.g., "18512") of user 101 and a customer identifier of user 101 (e.g., "3108"). As illustrated in FIG. 2B, executed RTP engine 214 may parse linking data 232, obtain the long-form URL, and package the long-form URL into an unstructured message field 234 of RFP message 216. The disclosed embodiments are, however, not limited to RFP messages populated with these exemplary elements of customer, merchant, payment, transaction, and additional remittance data, and in other examples, RFP message 216 may include any additional, or alternate, message fields specified within field mapping data 218 and consistent with the ISO 20022 standard for electronic data exchange, and executed RTP engine 214 may populate these message fields with any additional, or alternate, structured and formatted elements of customer, merchant, payment, transaction, or additional remittance data appropriate to RFP message 216 and field mapping data 218.

Referring back to FIG. 2A, executed RTP engine 214 may perform operations that cause merchant computing system 110 to broadcast now-populated RFP message 216 across network 120 to FI computing system 130, either directly or via one or more intermediate computing systems 236. By way of example, the one or more intermediate computing systems 236 may include, but are not limited to, a computing system associated with the financial institution of merchant 111 (e.g., that issued the merchant account to merchant 111) and one or more computing systems of a clearinghouse associated with the RTP ecosystem. In some instances, prior to broadcasting now-populated RFP message 216 across network 120, executed RTP engine 214 may perform operations that encrypt RFP message 216 using an encryption key, and examples of the encryption key include, but are not limited to, a public cryptographic key associated with FI computing system 130.

In some examples, one or more of intermediate computing systems 236 may perform operations that, among other things, validate a structure or a composition of RFP message, and based on the validation of the structure or composition of RFP message 216, that obtain a network address of FI computing system 130 (e.g., based on a portion of the information maintained within message field 226), and that route validated RFP message 216 across network 120 to FI computing system 130, which may perform any of the exemplary RTP processes described herein to not only enable merchant 111 to request, and receive confirmation of, a payment for the purchased building materials in real-time and contemporaneously upon completion of provisioning the building materials, but also to automatically reconcile RFP message 216 issued by the merchant 111 to the user 101 with corresponding elements of remittance advice received by FI computing system 130 and with a real-time payment approved by, and executed on behalf of, user 101.

Figure 3A:
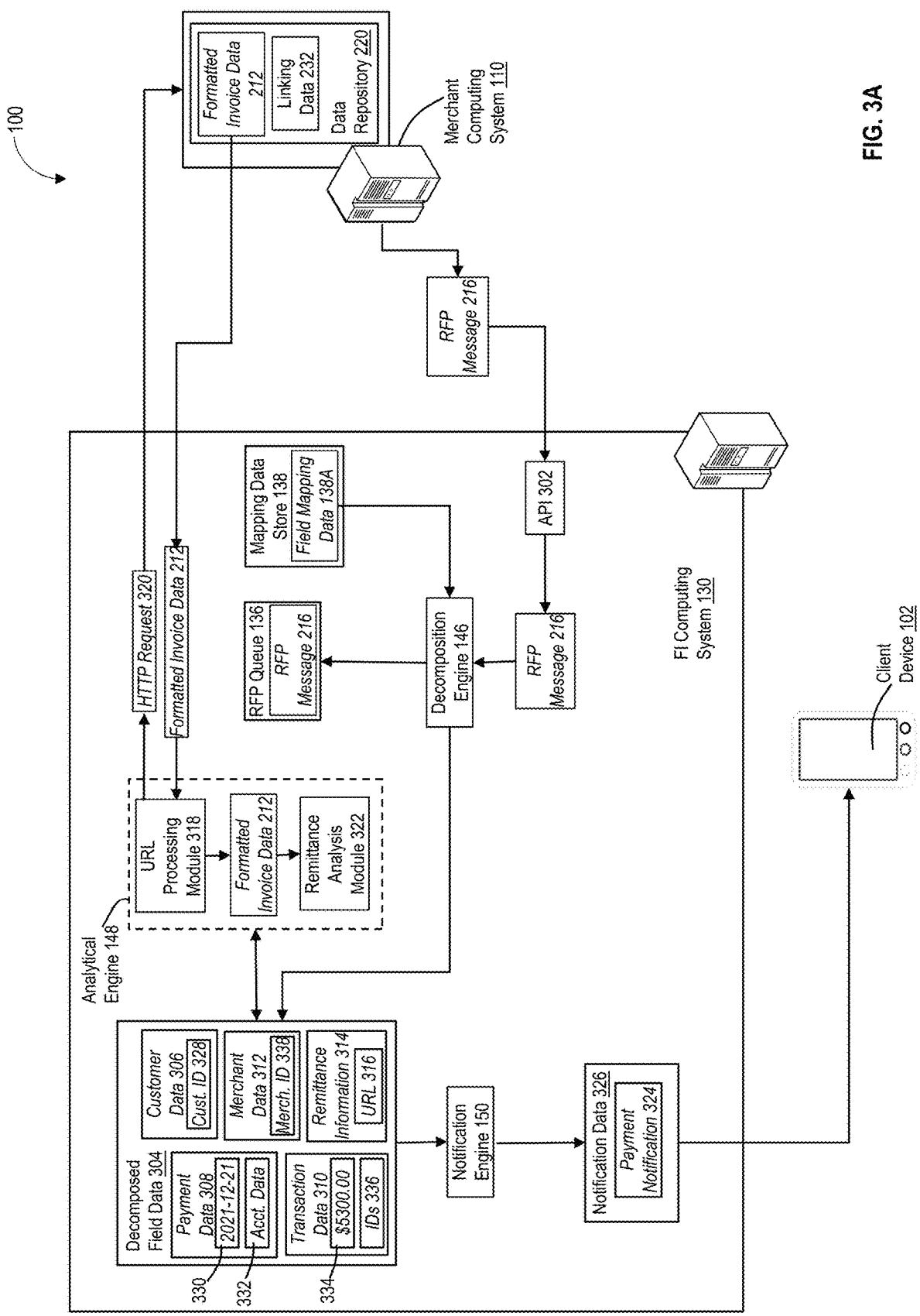
FIGS. 3A-3C and 4A-4C are block diagrams illustrating portions of an exemplary computing environment, in accordance with some exemplary embodiments.

Referring to FIG. 3A, a programmatic interface established and maintained by FI computing system 130, such as application programming interface (API) 302, may receive RFP message 216, and may route RFP message 216 to decomposition engine 146, which may be executed by the one or more processors of FI computing system 130. As described herein, FI computing system 130 may receive RFP message 216 directly across network 120 via a channel of communications established programmatically between API 302 and executed RTP engine 214 of merchant computing system 110. In other instances, FI computing system 130 may receive RFP message 216 across network 120 from one or more of intermediate computing systems 236, such as, but not limited to, the one or more computing systems associated with the clearinghouse. Further, and as described herein, one or more portions of RFP message 216 may be encrypted (e.g., using a public cryptographic key associated with FI computing system 130), and executed decomposition engine 146 may perform operations that access a decryption key maintaining within the one or more tangible, non-transitory memories of FI computing system 130 (e.g., a private cryptographic key associated with FI computing system 130), and that decrypt the encrypted portions of RFP message 216 using the decryption key.

In some cases, executed decomposition engine 146 may store RFP message 216 (in decrypted form) within a corresponding portion of data repository 134, e.g., within RFP message queue 136. Executed decomposition engine 146 may also perform operations that access mapping data store 138 (e.g., as maintained within data repository 134), and obtain one or more elements of field mapping data 138A that characterize a structure, composition, or format of one or more data fields of RFP message 216. For example, and as described herein, RFP message 216 may include message fields consistent with the ISO 20022 standard for electronic data exchange between financial institutions, and each of the message fields may be populated with data structured and formatted in accordance with the ISO 20022 standard.

As described herein, RFP message 216 may be associated with a real-time payment of $5,300.00 requested from user 101 by merchant 111 for the building materials on Dec. 14, 2021. By way of example, RFP message 216 may include, but is not limited to, a message field populated with data specifying the requested payment date of December $21^{st}$ (e.g., message field 220 of FIG. 2B) and message fields populated within data specifying the requested payment amount of US $5,300.00 (e.g., message fields 222 of FIG. 2B). RFP message 216 may also include, but is not limited to, message fields populated with data that identify and characterize user 101 (e.g., message fields 224 of FIG. 2B) and merchant 111 (e.g., message fields 228 of FIG. 2B). In some instances, RFP message 216 may also include message fields populated with data that identifies the payment instrument held by user 101 and capable of funding the requested payment (e.g., message field 226 of FIG. 2B) and additionally, or alternatively, message fields populated with data that identifies the merchant account capable of receiving funds derived from the requested payment (e.g., message field 230 of FIG. 2B).

Further, and as described herein, RFP message 216 may include one or more additional data fields populated with structured or unstructured remittance data, such as, but not limited to, a long-form URL that points to formatted invoice data 212 maintained within data repository 204 (e.g., message field 234 of FIG. 2B, which may include http://www.DCrocLumberSupply.com/receipt?custid='3108' ?zip='18512'). The disclosed examples are, however, not limited to structured or unstructured remittance data that includes a long-form URL, and examples are contemplated in which the structured or unstructured remittance data may include one or more identifiers (e.g., UPCs, etc.) of the purchased building materials, or a shortened URL that points to formatted invoice data 212.

Based on the obtained elements of field mapping data 138A, executed decomposition engine 146 may perform operations that parse RFP message 216 and obtain elements of decomposed field data 304 that identify and characterize user 101, merchant 111, and the requested payment for the building materials on Dec. 21, 2021. In some instances, through the performance of one or more of these exemplary processes, executed decomposition engine 146 may "decompose" the structured or unstructured data populating the message fields of RFP message 216 in accordance with field mapping data 138A, and generate the elements of decomposed field data 304 that include, but are not limited to, elements of customer data 306, payment data 308, transaction data 310, and merchant data 312. Executed decomposition engine 146 may also perform operations that store the elements of decomposed field data 304, including the elements of customer data 306, payment data 308, transaction data 310, and merchant data 312, within a corresponding portion of a tangible, non-transitory memory accessible to merchant computing system 110, e.g., within data repository 134 (not illustrated in FIG. 3A).

Byway of example, and based on the elements of field mapping data 138A, executed decomposition engine 146 may determine that message fields 224 of RFP message 216 include data that identifies and characterizes user 101, and may perform operations that obtain, from message fields 224, a customer name of user 101 (e.g., "Picketts' Construction") and a customer address of user 101 (e.g., "3108 Cypress St., Throop, Pennsylvania, 18512, U.S."). As illustrated in FIG. 3A, executed decomposition engine 146 may package the obtained customer name and postal address into corresponding portions of customer data 306. Further, based on the elements of field mapping data 138A, executed decomposition engine 146 may determine that message fields 220 and 226 of RFP message 216 include data identifying respective ones of the requested payment date and the payment instrument held by user 101 and capable of funding the requested payment. In some instances, executed decomposition engine 146 may perform operations that obtain, from respective ones of message fields from message fields 220 and 226, the requested payment date of Dec. 21, 2021, and the information that identifies the payment instrument (e.g., the account number "XXXX-1234-5678-9012"), which executed decomposition engine 146 may package into corresponding portions of payment data 308.

Executed decomposition engine 146 may also determine, based on the elements of field mapping data 138A, that message fields 222 of RFP message 216 include data identifying the requested payment amount and the currency associated with that requested payment amount, and may perform operations that obtain, from respective ones of message fields 230, data that identifies the $5,300.00 requested payment amount and the requested denomination in U.S. currency. Executed decomposition engine 146 may also package the obtained data within corresponding portions of transaction data 310. Further, and based on the elements of field mapping data 138A, executed decomposition engine 146 may determine that message fields 228 and 230 are populated with data that identifies and characterizes merchant 111 and the merchant account configured to receive the funds derived from the requested payment. Executed decomposition engine 146 may perform operations that obtain, from message fields 228, the merchant name of merchant 111 (e.g., "Davy's Lumber and Supply") and a postal address associated with merchant 111 (e.g., "123 Main Street, Scranton, Pennsylvania, 18504, U.S."), and that obtain the data identifying the merchant account from message field 230 (e.g., the account number "XXXX-9012-3456-7890" of the merchant account). Further, executed decomposition engine 146 may perform additional operations that package the obtained merchant name, the obtained merchant address, and the obtained data identifying the merchant account into corresponding portions of merchant data 312.

Additionally, and as described herein, executed decomposition engine 146 may also determine, based on the elements of field mapping data 138A, that message field 234 of RFP message 216 includes structured or unstructured elements of remittance data that characterizes further user 101 and merchant 111 of the purchased building materials associated with the requested, real-time payment. In some instances, executed decomposition engine 146 may obtain the structured or unstructured elements remittance data from message field 234 and package the obtained elements of remittance data into corresponding portions of remittance information 314. For example, the elements of structured or unstructured remittance data may include the long-form URL that points to formatted invoice data 212 maintained within data repository 204, and executed decomposition engine 146 may obtain the long-form URL from message field 234 of RFP message 216, and package that long-form URL into remittance information 314, e.g., as URL 316.

As described herein, the elements of formatted invoice data 212 maintained by merchant computing system 110 may be structured in accordance with one or more standardized document formats, such as a PDF or an HTML format, and may identify user 101 (e.g., the customer name and postal address, etc.) and merchant 111 (e.g., the merchant name, postal address, telephone number, etc.). Further, and as described herein, the elements of formatted invoice data 212 may also include information that identifies the order (e.g., a project name, the December 21st delivery date, etc.), along with additional information that identifies the building materials associated with the requested payment (e.g., the UPCs of the purchased building materials, etc.), the unit costs of the purchased building materials (e.g., the $1,200.00 cost for the plywood, the $700.00 cost of the purchased rolls of roof underlayment, the $3,100.00 cost of the roofing shingles, etc.), and the aggregate costs for the building materials (e.g., the $5,000.00 subtotal, the $300.00 in imposed taxes, and the total cost of $5,300.00).

In some instances, the one or more processors of FI computing system 130 may execute analytical engine 148, which may perform operations that, based on URL 316 maintained within remittance information 314 of decomposed field data 304, programmatically access the elements of formatted invoice data 212 maintained at merchant computing system 110, and that process the accessed elements of formatted invoice data 212 to obtain additional, or alternate, elements of customer data 306, payment data 308, transaction data 310, or merchant data 312. For example, a URL processing module 318 of executed analytical engine 148 may access URL 316 maintained within remittance information 314 (e.g., the long-firm URL described herein, a shortened URL, etc.), and may process URL 316 and generate a corresponding HTTP request 320 for the elements of formatted invoice data 212 maintained at merchant computing system 110. Executed URL processing module 318 may also perform operations that cause FI computing system 130 to transmit HTTP request 320 across network 120 to merchant computing system 110.

Merchant computing system 110 may, for example, receive HTTP request 320, and based on portions of HTTP request 320 and linking data 232 (e.g., based on a determined match or correspondence between the portions of HTTP request 320 and linking data 232), merchant computing system 110 may perform operations that obtain the elements of formatted invoice data 212 from data repository 204, and that transmit the elements of formatted invoice data 212 across network 120 to FI computing system 130, e.g., as a response to HTTP request 320. Further, as illustrated in FIG. 3A, executed URL processing module 318 may receive the elements of formatted invoice data 212 from merchant computing system 110, and may route the elements of formatted invoice data 212 to a remittance analysis module 322 of executed analytical engine 148.

Upon execution by the one or more processors of FI computing system 130, executed remittance analysis module 322 may perform any of the exemplary processes described herein to parse the elements of formatted invoice data 212 (e.g., in a received format, such as a PDF or HTML form, or in a transformed or enhanced format, etc.) and obtain, from the parsed elements of formatted invoice data 212, one or more of the additional, or alternate, elements of customer data 306, payment data 308, transaction data 310, or merchant data 312. By way of example, executed remittance analysis module 322 may apply one or more optical character recognition (OCR) processes or optical word recognition (OWR) processes to the elements of formatted invoice data 212 in PDF form to generate, or obtain, elements of textual content representative of the data that characterize user 101, merchant 111, the requested payment, or the purchased building materials (e.g., the UPCs of the purchased building materials).

Byway of example, executed remittance analysis module 322 may perform operations that detect a presence one or more keywords within the generated elements of textual content (e.g., "UPC," "subtotal," "project," "delivery date," etc.), and may extract elements of the textual content associated with these keywords as corresponding ones of the additional, or alternate, elements of customer data 306, payment data 308, transaction data 310, or merchant data 312. In other examples, executed remittance analysis module 322 may detect a presence of the additional, or alternate, elements of customer data 306, payment data 308, transaction data 310, or merchant data 312 within the generated textual content based on an application of one or more adaptively trained machine learning or artificial intelligence models to portions of the textual content, and examples of these adaptively trained machine learning or artificial intelligence models includes a trained neural network process (e.g., a convolutional neural network, etc.) or a decision-tree process that ingests input datasets composed of all, or selected portions, of the textual content.

In some examples, the elements of formatted invoice data 212 may be structured in accordance with a document template, and executed remittance analysis module 322 may perform operations that identify the additional, or alternate, elements of customer data 306, payment data 308, transaction data 310, or merchant data 312 within the textual content, and that extract the additional, or alternate, elements of customer data 306, payment data 308, transaction data 310, or merchant data 312 from the textual content, based on information that characterizes the structure specified by the document template. The disclosed embodiments are, however, not limited to exemplary processes for detecting and extracting one or more of the additional, or alternate, elements of customer data 306, payment data 308, transaction data 310, or merchant data 312 from the generated textual content, and in other instances, executed remittance analysis module 322 may perform any additional, or alternate, process for identifying one or more of the additional, or alternate, elements of customer data 306, payment data 308, transaction data 310, or merchant data 312 within the textual content derived from the processing of the elements of formatted invoice data 212 in PDF format.

Further, and as described herein, the elements of formatted invoice data 212 may be structured in HTML form, and may include metadata that identify and characterize user 101 (e.g., the customer name or postal address, etc.), merchant 111 (e.g., the merchant name or postal address, etc.), the requested payment, or the purchased building materials (e.g., UPCs of the purchased sheets of plywood, rolls of roof underlayment, and bundles of roofing shingles, total costs for the purchased sheets of plywood, rolls of roof underlayment, and bundles of roofing shingles, etc.). Executed remittance analysis module 322 may perform operations that detect one or more of the elements of metadata within the elements of formatted invoice data 212, and that obtain, from the elements of metadata, one or more of the additional, or alternate, elements of customer data 306, payment data 308, transaction data 310, or merchant data 312. The disclosed embodiments are, however, not limited to these exemplary processes for detecting and extracting the additional, or alternate, elements of customer data 306, payment data 308, transaction data 310, or merchant data 312 from HTML-formatted receipt data, and in other instances, executed remittance analysis module 322 may perform any additional, or alternate, process detecting and obtaining data from the elements of formatted invoice data 212 structured in HTML form, including, but not limited to, an application of one or more screen-scraping processes to portions of formatted invoice data 212 structured in HTML form.

As described herein, the elements of formatted invoice data 212 may include, among other things, information characterizing the building materials (e.g., a project name, the December 21$^{st}$ delivery date, etc.), identifiers of the purchased building materials (e.g., the names of the building materials, the UPCs of the purchased sheets of plywood, rolls of roof underlayment, and bundles of shingles, etc.), the unit costs of the purchased building materials (e.g., the $1,200.00 cost for the purchased sheets of plywood, the $700.00 cost for the purchased rolls of roof underlayment, the $3,100.00 cost for the bundle of shingles, etc.), and the aggregate costs for the building materials (e.g., the $5,000.00 subtotal, the $300.00 in imposed taxes, and the total cost of $5,300.00). By way of example, and through an implementation of any of the exemplary processes described herein, executed remittance analysis module 322 may obtain, from the processed elements of formatted invoice data 212, project information that identifies the building materials and the purchase date of Dec. 21, 2021, and one or more identifiers of the purchased building materials (e.g., the names of the purchased building materials, and the UPCs of the purchased sheets of plywood, rolls of roof underlayment, and bundles of shingles), and may store the project information and the identifiers within a portion of decomposed field data 304, e.g., within a portion of transaction data 310 (not illustrated in FIG. 3A).

The disclosed embodiments are, however, not limited to processes that obtain information characterizing the building materials and identifiers of the purchased building materials from the processed elements of formatted invoice data 212. In other instances, executed remittance analysis module 322 perform any of the exemplary processes described herein to extract or obtain any additional, or alternate, information that identifies or characterizes user 101, merchant 111, the requested payment, the roofing project, or the purchased building materials from the processed elements of formatted invoice data 212. In some instances, executed decomposition engine 146 may perform operations that store decomposed field data 304, which includes the element of customer data 306, payment data 308, transaction data 310, merchant data 312, and remittance information 314, within a corresponding portion of data repository 134, such as within an element 315 of RTP data store 142.

Referring back to FIG. 3A, and upon execution by the one or more processors of FI computing system 130, notification engine 150 may perform operations that access data repository 134, and obtain decomposed field data 304 that includes one or more elements of customer data 306, payment data 308, transaction data 310, merchant data 312, and remittance information 314, as extracted from the structured or unstructured message fields of RFP message 216 and as obtained from the processed elements of formatted invoice data 212. As described herein, the one or more elements of customer data 306, payment data 308, transaction data 310, merchant data 312, and remittance information 314 may collectively identify and characterize the $5,300.00 payment requested from merchant 111 (e.g., Davy's Lumber and Supply) for the building materials purchased on Dec. 14, 2021, which includes the $1,200.00 cost for the purchased sheets of plywood, the $700.00 cost of the purchased rolls of roof underlayment, the $3,100.00 cost of the bundles of shingles, and the $300.00 in imposed sales taxes. In some instances, based on portions of decomposed field data 304, executed notification engine 150 may perform operations that generate a payment notification 324 associated with the requested $5,300.00 payment, and that generate notification data 326 that includes, among other things, payment notification 324 and elements of remittance data 343 that include portions of decomposed field data 304 and a unique identifier of RFP message 216 assigned by FI computing system 130.

By way of example, executed notification engine 150 may perform operations that parse customer data 306 within decomposed field data 304 and obtain a customer identifier 328, such as, but not limited, a full name of user 101 extracted from message fields 224 of RFP message 216 (e.g., "Picketts' Construction"). Executed notification engine 150 may also perform operations that parse payment data 308, and obtain, among other things, a payment date 330 associated with the requested $5,300.00 payment (e.g., Dec. 14, 2021) and account data 332 that identifies the payment instrument held by user 101 and capable of funding the requested $5,300.00 payment (e.g., the account number "XXXX-1234-5678-9012" and/or the bank routing number "123456789," etc.). Further, in some examples, executed notification engine 150 may parse transaction data 310 to obtain a payment amount 334 of the requested $5,300.00 payment (e.g., $5,300.00), and one or more identifiers 336 associated with the first order (e.g., a project name, etc.) and the purchased building materials associated with requested $5,300.00 payment (e.g., the names of the building materials, the UPCs of the purchased sheets of plywood, rolls of roof underlayment, and bundles of shingles, etc.).

Executed notification engine 150 may also perform operations that parse merchant data 312 to obtain a merchant identifier 338 of merchant 111, and examples of merchant identifier 338 include, but are not limited to the merchant name (e.g., "Davy's Lumber and Supply") or a unique, alphanumeric identifier assigned to merchant 111 by FI computing system 130. The disclosed embodiments are, however, not limited to these exemplary elements of data that identify and characterize the requested $5,300.00 payment, and in other examples, executed notification engine 150 may perform operations that parse one or more of customer data 306, payment data 308, transaction data 310, merchant data 312, and remittance information 314 and obtain any additional, or alternate, elements of data that identify and characterize the requested $5,300.00 payment, such as, but not limited to, the unit costs of the purchased building materials (e.g., the US $1,200.00 cost for the purchased sheets of plywood, the US $700.00 cost for the purchased rolls of roof underlayment, the US $3,100.00 cost of the bundles of shingles, etc.), an address of merchant 111, or one or more of the aggregate costs for the building materials (e.g., the US $5,000.00 subtotal, the US $300.00 in imposed taxes, and the total cost of US $5,300.00, etc.).

As illustrated in FIG. 3A, executed notification engine 150 may perform operations that package all, or selected portion of, customer identifier 328, payment date 330, account data 332, payment amount 334, identifiers 336, and/or merchant identifier 338 into corresponding portions of payment notification 324, which may be incorporated within notification data 326. In some instances, not illustrated in FIG. 3A, executed notification engine 150 may also perform operations that package, into an additional portion of payment notification 324, elements of layout data that specifies a disposition of, or a visual characteristic of, one or more interface elements that establish a graphical representation of payment notification 324 associated with the requested $5,300.00 payment, e.g., when presented on a digital interface by an application program executed by client device 102, such as mobile banking application 108 described herein. Further, executed notification engine 150 may perform additional operations that cause FI computing system 130 to transmit notification data 326 across network 120 to client device 102.

Figure 3B:
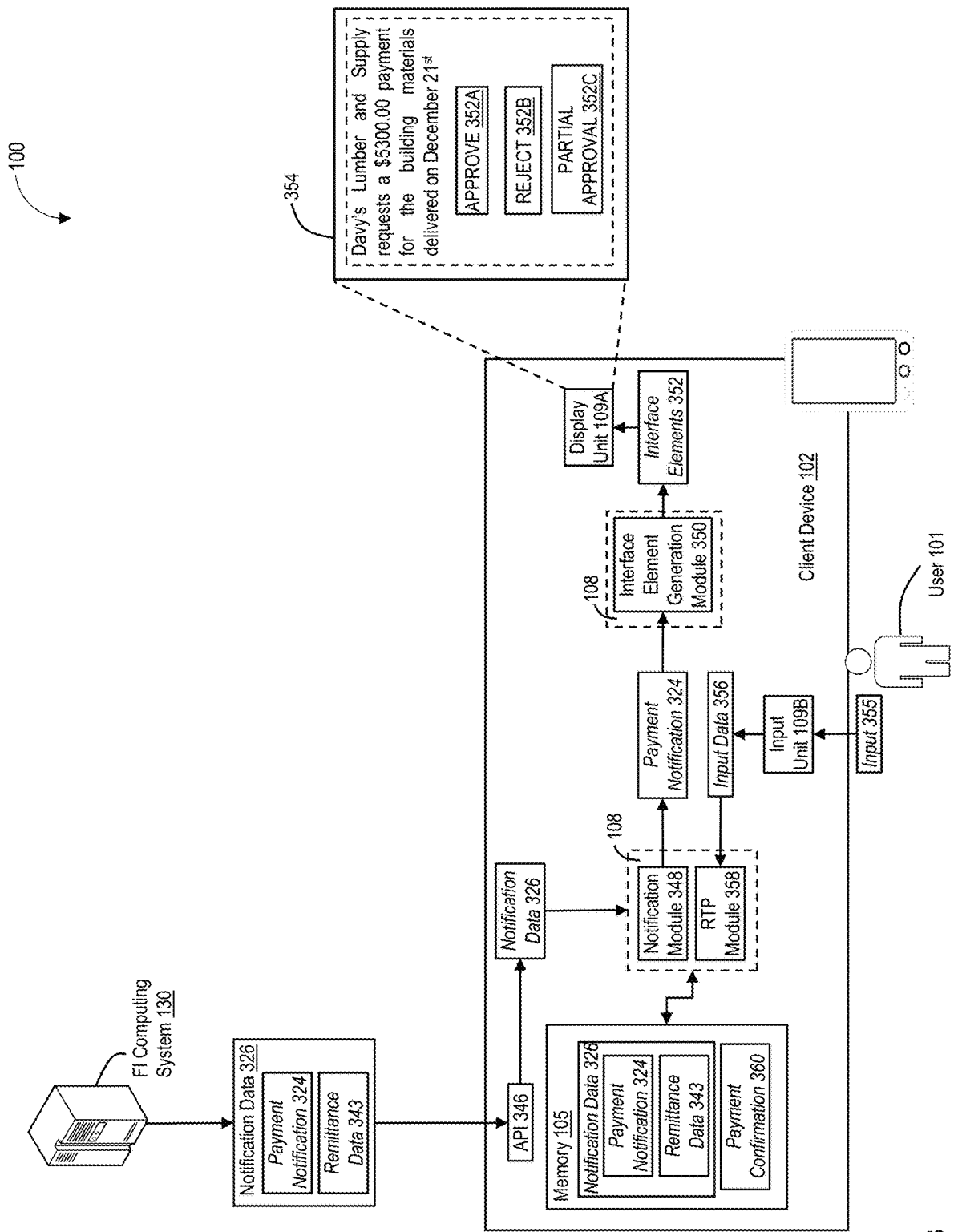

Referring to FIG. 3B, a programmatic interface associated with one or more application programs executed at client device 102, such as an application programming interface (API) 346 associated with mobile banking application 108, may receive notification data 326 and perform operations that cause client device 102 to execute mobile banking application 108 (e.g., through a generation of a programmatic command, etc.). Upon execution by the one or more processors of client device 102, executed mobile banking application 108 may receive notification data 326 from API 346, and executed mobile banking application 108 may perform operations that store notification data 326, which includes payment notification 324, within a corresponding portion of a tangible, non-transitory memory, e.g., within a portion of memory 105.

Further, and by way of example, a notification module 348 of executed mobile banking application 108 may parse notification data 326 (e.g., as maintained within memory 105) and obtain payment notification 324, which includes customer identifier 328, payment date 330, account data 332, payment amount 334, identifiers 336, and/or merchant identifier 338 that characterize the $5,300.00 payment requested by merchant 111 from user 101 on Dec. 21, 2021, for the building materials. Executed notification module 348 may provide payment notification 324 as an input to an interface element generation module 350 of executed mobile banking application 108, and executed interface element generation module 350 may perform operations that generate and route interface elements 352 to display unit 109A. In some instances, when rendered for presentation within a corresponding notification interface 354 by display unit 109A, interface elements 352 provide a graphical representation of payment notification 324 to user 101 within a single display screen or window, or across multiple display screens or windows, of notification interface 354 (e.g., in accordance with the one or more elements of layout data, as described herein). As illustrated in FIG. 3B, when presented within notification interface 354, the graphical representation of payment notification 324 may prompt user 101 to approve, partially approve, or reject the $5,300.00 payment requested by Davy's Lumber and Supply for the building materials purchased on Dec. 14, 2021, e.g., based on additional input provided to input unit 109B of client device 102 that selects a respective one of an "APPROVE" icon 352A, a "REJECT" icon 352B, and a "PARTIAL APPROVAL" icon 352C presented within notification interface 354.

In some instances, not illustrated in FIG. 3B, user 101 may elect to reject the $5,300.00 real-time payment requested by merchant 111 for the building materials, and user 101 may provide input 355 to client device 102 (e.g., via input unit 109B) that selects "REJECT" icon 352B. Based on the input, input unit 109B may route (not illustrated in FIG. 3B) input data indicative of provisioned input, and the selection of "REJECT" icon 352B by user 101 to executed notification module 348 of mobile banking application 108. In some instances, executed mobile banking application 108 may perform operations that generate and transmit a response to the notification data that includes a payment confirmation indicative of the rejection, by user 101, of the $5,300.00 real-time payment requested by merchant 111 for the building materials to FI computing system 130. Upon receipt of the payment confirmation, FI computing system 130 may perform operations that delete the RFP message corresponding to the first order from RFP message queue 136, and generate and transmit one or more additional, ISO-20022-compliant messages to merchant computing system 110 indicative of the rejected payment, either directly across network 120 or through one or more of the computing systems of the clearinghouse and/or the financial institution of merchant 111.

In other instances, user 101 may elect to approve the $5,300.00 real-time payment requested by merchant 111 for the building materials, and user 101 may provide input 355 to client device 102 (e.g., via input unit 109B) that selects "APPROVE" icon 352A. As illustrated in FIG. 3B, input unit 109B may route input data 356 indicative of provisioned input 355, and the selection of "APPROVE" icon 352A by user 101, to a real-time payment (RTP) module 358 of executed mobile banking application 108. In some instances, executed RTP module 358 may perform operations that process input data 356 and generate a payment confirmation 360 indicative of the approval, by user 101, of the $5,300.00 real-time payment requested by merchant 111 for the now-delivered building materials, and that store payment confirmation 360 within a corresponding portion of memory 105, e.g., in conjunction with or in association with payment notification 324. In some instances, payment confirmation 360 may include the unique identifier of the RFP message 216 (e.g., as obtained from remittance data 343) and advice data that characterizes, among other things, the total amount of the approved payment (e.g., the approved $5,300.00 payment), those portions of the approved payment associated with each of the purchased products (e.g., the $1,200.00 cost for the purchased sheets of plywood, the $700.00 cost of the purchased roof underlayment, the $3,100.00 cost of the bundles of roof shingles), and a portion of the approved payment attributable to local taxes ($300.00).

In some examples, not illustrated in FIG. 3B, user 101 may elect to approve partially a real-time payment requested by a merchant, such as merchant 111 By way of example, and subsequent to approving the $5,300.00 real-time payment requested by merchant 111, user 101 may elect to initiate a second order to purchase additional products, such as ten five-inch by ten-foot white vinyl gutters for $60.00, from the merchant 111. Merchant 111 may receive the ten gutters from a distributor and inform user 101 that the gutters are ready to pick-up at merchant's 111 retail location, and user 101 may arrive at merchant's 111 store on Dec. 28, 2021 to complete the transaction for the second order. Either when user 101 places the second order, or when user 101 arrives to complete the transaction for the second order, merchant computing system 110 may perform any of the exemplary processes described herein to generate and transmit a second RFP message to FI computing system 130. Upon receipt of the second RFP message from the merchant computing system 110, FI computing system 130 may perform any of the exemplary processes described herein to generate and transmit additional notification data, such as notification data 364 that includes a payment notification 366 associated with the second RFP message and elements of remittance data 368 that include a unique identifier assigned to the second RFP message by merchant computing system 110 and portions of decomposed field data obtained, extracted, or derived from the second RFP message (e.g., including one or more of the exemplary elements of decomposed field data described herein), to client device 102.

Figure 3C:
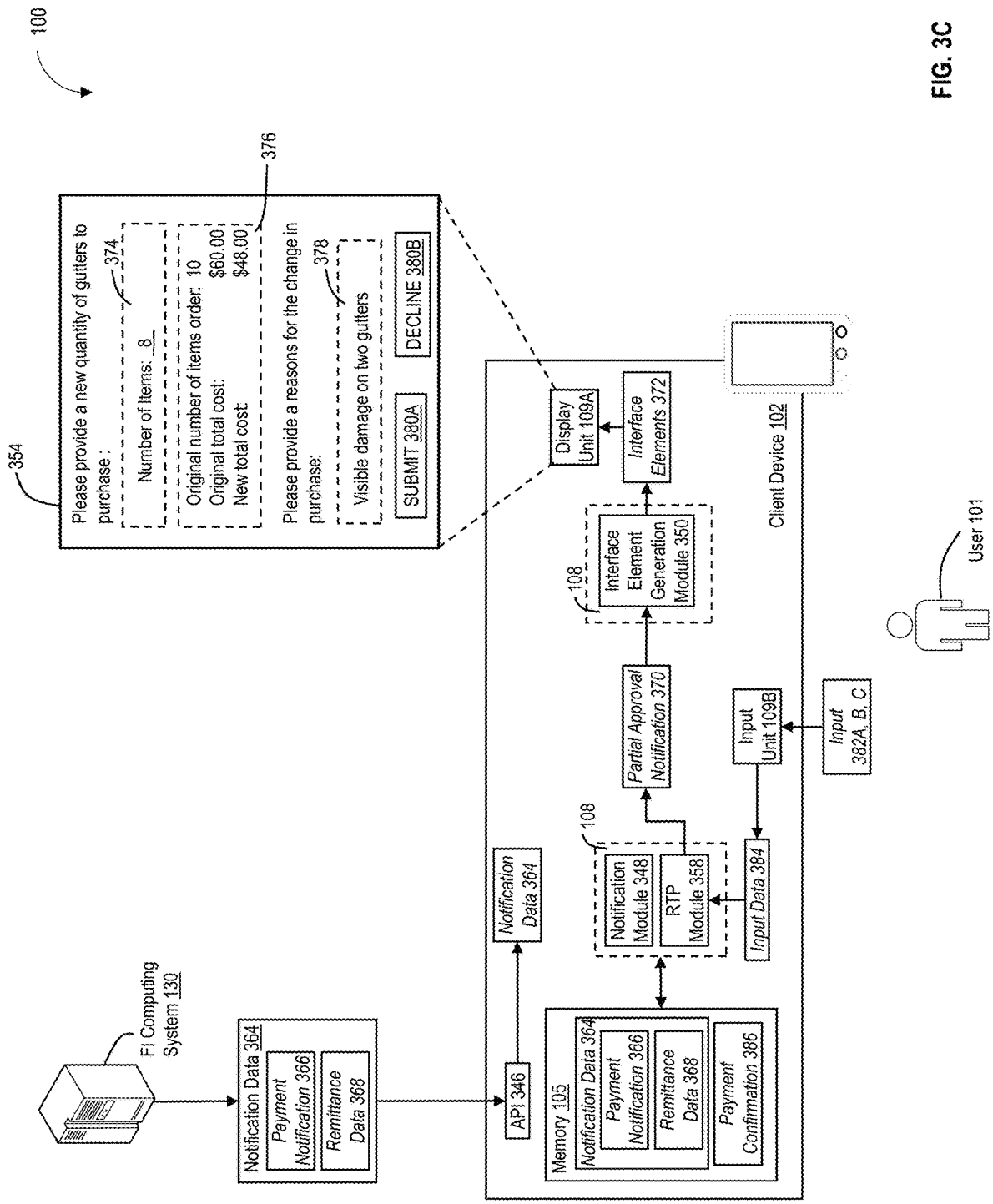

Referring to FIG. 3C, API 346 may receive notification data 364, which includes payment notification 364 and remittance data 368, and may route notification data 364 to executed notification module 348. In some instances, executed notification module 348 may store notification data 365 within a corresponding portion of memory 105, although not illustrated in FIG. 3C, executed notification module 348 may perform any of the exemplary processes described herein to generate additional interface elements representative of payment notification 366 and remittance data 368, and to present a graphical representation of the additional interface elements within a single display screen or window, or across multiple display screens or windows, of notification interface 354 (e.g., in accordance with the one or more elements of layout data, as described herein). When presented within notification interface 354, the graphical representation of the payment notification may prompt user 101 to approve, approve partially, or reject the $60.00 payment requested by Davy's Lumber and Supply for the vinyl gutters, e.g., based on additional input provided to input unit 109B of client device 102 that selects a respective one of an "APPROVE" icon, a "REJECT" icon, and a "PARTIAL APPROVAL" icon presented within notification interface 354 (not illustrated in FIG. 3C).

In some instances, not illustrated in FIG. 3C, user 101 may elect to partially approve the $60.00 real-time payment requested by merchant 111 for the ten gutters, and provide input to input unit 109B that selects the "PARTIAL APPROVAL" icon. For example, user 101 may decide that ten gutters are no longer necessary to complete the roofing project, and may now elect to purchase nine gutters. In other examples, one or more of the products (e.g., two of the purchased gutters) may arrive damaged at the retail location of merchant 111 store, and user 101 may elect to only purchase the undamaged gutters. Upon receipt of input selecting the of "PARTIAL APPROVAL" icon within notification interface 354 input unit 109B may route additional input data indicative of the selection of the "PARTIAL APPROVAL icon" by user 101 to RTP module 358 of executed mobile banking application 108 (also not illustrated in FIG. 3B).

Executed RTP module 358 may perform operations that process input data and generate a partial approval notification 370, which includes customer identifier 328 of user 101, merchant identifier 338 of merchant 111, and additional elements of data that identify and characterize the additional, $60.00 real-time payment requested by merchant 111 for the ten gutters (e.g., as obtained from remittance data 368). Executed RTP module 358 may also provide partial approval notification 370 as an input to executed interface element generation module 350, which may perform operations that generate and route interface elements 372 to display unit 109A. In some instances, when rendered for presentation within a corresponding notification interface 354 by display unit 109A, interface elements 372 provide a graphical representation of partial approval notification 370 to user 101 within a single display screen or window, or across multiple display screens or windows, of notification interface 354 (e.g., in accordance with the one or more elements of layout data, as described herein).

For example, when presented within notification interface 354, the graphical representation of partial approval notification 370 may prompt user 101 to provide, as input 382A to client device 102 (e.g., via input unit 109B), a proposed modification to the number of items associated with the second order. For example, interface elements 372 may include interactive interface elements 374 that, when presented within notification interface 354, prompt user 101 to provide input to client device 102 that specifies a new quantity of gutters to purchase, e.g., eight. Further, interface elements 372 may include one or more modification-specific interface elements 376 that provide a graphical representation of information that characterizes the second order, as originally placed (e.g., an original number of items ordered, an original cost of order, etc.), and an update to the second order that reflects the modifications specified by user 101 (e.g., an updated cost of order based on the modified quantity of items purchased, etc.). Interface elements 372 may also include an interactive text box 378 that prompts user 101 to provide, as input 382B, textual comments on reasons for changing the purchase or providing a partial payment (e.g., "Visible damage on two gutters"). As illustrated in FIG. 3C, the graphical representation of partial approval notification 370 may further prompt user 101 to submit the partial approval to FI computing system 130 (e.g., based on additional input 382C provided to input unit 109B of client device 102 that selects a "SUBMIT" icon 380A presented within notification interface 354) or alternatively, to decline to submit a partial approval of the order (e.g., based on additional input provided to input unit 109B of client device 102 that selects a "DECLINE" icon 380B presented within notification interface 354).

In some instances, not illustrated in FIG. 3C, having provided input to decline the partial approval (e.g., based on the additional input provided to input unit 109B of client device 102 that selects the "DECLINE" icon 378B), executed mobile banking application 108 may perform operations, that generate and transmit a response to the notification data that includes a payment confirmation and of the rejected payment and the unique identifier of the second RFP message across network 120 to FI computing system 130. Upon receipt of the payment confirmation FI computing system 130 may perform operations that delete the RFP message corresponding to the second order from RFP message queue 136, and generate and transmit one or more additional, ISO-20022-compliant messages to merchant computing system 110 indicative of the rejected payment, either directly across network 120 or through one or more of the computing systems of the clearinghouse and/or the financial institution of merchant 111.

Alternatively, and user 101 may elect to approve partially the requested $60.00 payment subject to the modification to the quantity of ordered gutters and in accordance with the conditions of the updated second order (e.g., the modified quantity of eight gutters and the updated $48.00 cost), and may provide input 382A, 382B, and 382C to input unit 109B. As illustrated in FIG. 3C, input unit 109B may route input data 384 indicative the partial approval and characterizing the updated second order to executed RTP module 358, which perform operations that process input data 384 and generate a payment confirmation 386 indicative of the partial approval, by user 101, of the second order and an approval of a real-time payment in the amount of $48.00 for the updated second order.

In some instances, payment confirmation 386 may include the unique identifier of the second RFP message (e.g., as obtained from remittance data 368) and information that characterizes, among other things, the total amount of the approved payment (e.g., $48.00 updated costs), those portions of approved payment associated with each of the purchased products (e.g., a $45.00 cost for eight gutters), and a portion of the approved payment attributable to local taxes ($3.00). Further, the information within payment confirmation 386 may also include exception characterizing one or more exceptions associated with the second order, such as products returned to merchant 111 unused, or defective products for which payment is withheld (e.g., information that identifies the modified quantity of eight gutters and the two gutters not accepted by user 101), and causal data characterizing a rationale or cause for the exception (e.g., the comments provided by user 101 characterizing the reason for changing the purchase or providing a partial payment). Executed RTP module 358 may also perform operations that store payment confirmation 386 within a corresponding portion of memory 105.

Figure 4A:
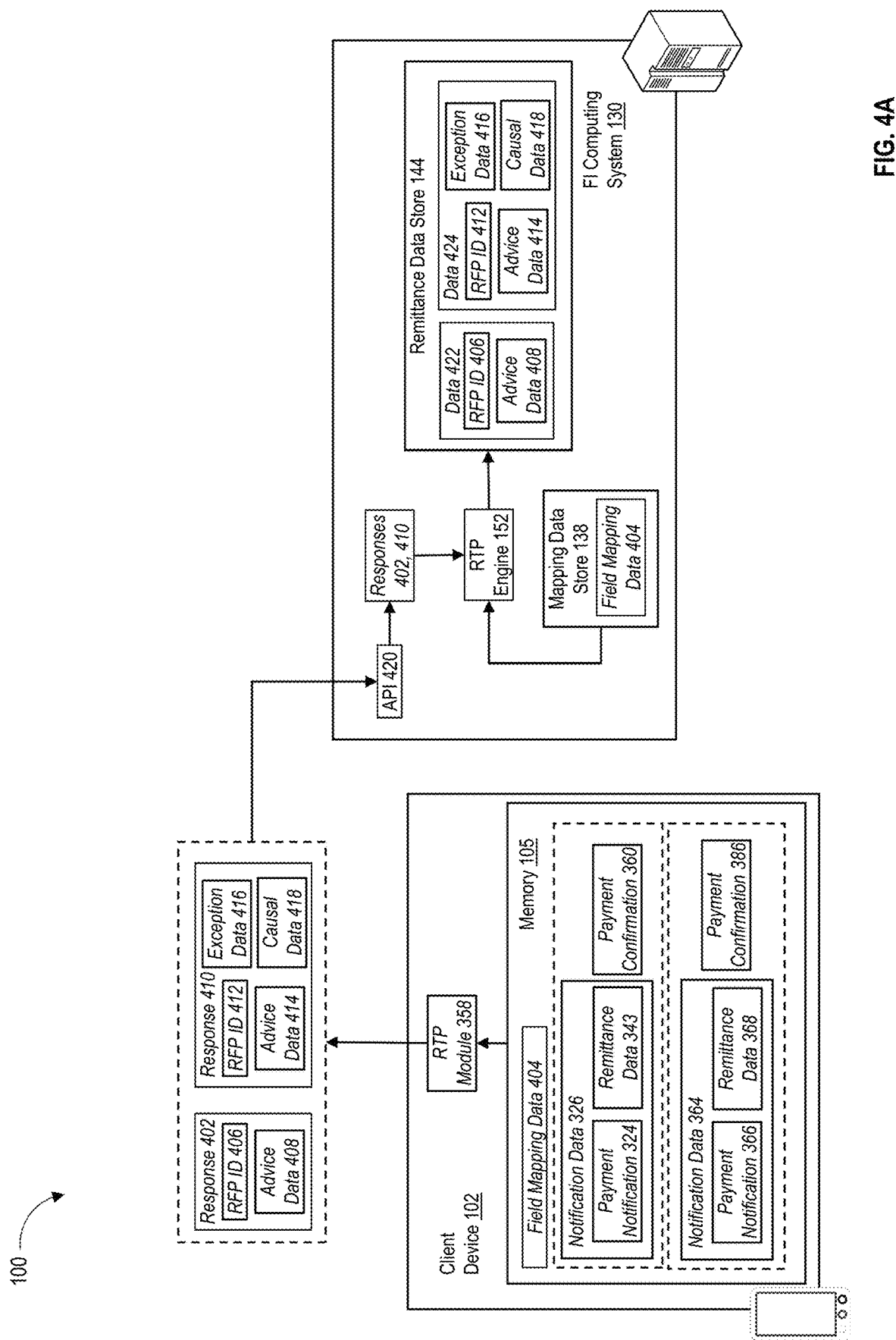

Referring to FIG. 4A, executed RTP module 358 may perform operations that access memory 105, and obtain the elements of notification data 326 associated with the $5,300 payment requested from user 101 by merchant 111 for the building materials and the elements of payment confirmation 360 that characterize the approval of the requested $5,300.00 payment by user 101. As described herein, payment confirmation 360 may include the unique identifier of the RFP message 216 (e.g., as obtained from remittance data 343) and advice data that characterizes, among other things, the total amount of the approved payment (e.g., the approved $5,300.00 payment), those portions of the approved payment associated with each of the purchased products (e.g., the $1,200.00 cost for the purchased sheets of plywood, the $700.00 cost of the purchased roof underlayment, the $3,100.00 cost of the bundles of roof shingles), and a portion of the approved payment attributable to local taxes ($300.00).

Based on portions of the obtained elements of notification data 326 and payment confirmation 360 (including the advice data associated with the approved $5,300.00 payment), executed RTP module 358 may perform any of the exemplary processes described herein to generate a response 402 to notification data 326 that identifies, and characterizes, the approval by user 101 of the $5,300.00 payment requested by merchant 111 and further, that includes message fields structured in accordance with one or more standardized data-exchange protocols, such as the ISO 20022 standard for electronic data exchange between financial institutions. For example, executed RTP module 358 may obtain, from memory 105, one or more elements of field mapping data 404 that characterize a structure, composition, or format of the message data populating one or more data fields of an ISO-20002-compliant response message, such as response 402, and executed RTP module 358 may parse notification data 326 and payment confirmation 360 and package corresponding portions of notification data 326 and payment confirmation 360 into the message fields of response 402 based on field mapping data 404. For example, as illustrated in FIG. 4A, response 402 may include, within the structured message fields, the unique identifier of RFP message 216, e.g., RFP identifier 406, and elements of advice data 408 that include the total amount of the approved payment (e.g., the approved $5,300.00 payment), those portions of the approved payment associated with each of the purchased products (e.g., the $1,200.00 cost for the purchased sheets of plywood, the $700.00 cost of the purchased roof underlayment, the $3,100.00 cost of the bundles of roof shingles), and a portion of the approved payment attributable to local taxes ($300.00). In some instances, executed RTP module 358 may perform operations that cause client device 102 to transmit response 402 across network 120 to FI computing system 130, e.g., contemporaneously with the approval of the requested $5,300.00 payment by user 101.

Further, executed RTP module 358 may also perform operations that access memory 105, and obtain the elements of notification data 364 associated with the requested $60.00 payment requested from user 101 by merchant 111 for the ten ordered gutters (e.g., associated with the second RFP message described herein) and payment confirmation 286 associated with the partial approval of the requested $60.00 payment subject to the modification to the quantity of ordered gutters and in accordance with the conditions of the updated second order (e.g., the modified quantity of eight gutters and the updated $48.00 cost). Based on portions of the obtained elements of notification data 364 and payment confirmation 386, executed RTP module 358 may perform any of the exemplary processes described herein to generate a response 410 to notification data 364 that identifies, and characterizes, the partial approval by user 101 of the $60.00 payment requested by merchant 111. In some instances, response 410 may include message fields structured in accordance with one or more standardized data-exchange protocols, such as the ISO 20022 standard for electronic data exchange between financial institutions, and executed RTP module 358 may parse notification data 364 and payment confirmation 386 and package corresponding portions of notification data 364 and payment confirmation 386 into the message fields of response 410 based on field mapping data 404.

For example, response 410 may include RFP identifier 412 of the second RFP message (e.g., as obtained from remittance data 368) and advice data 414 that characterizes, among other things, the total amount of the approved payment (e.g., $48.00 updated costs), those portions of approved payment associated with each of the purchased products (e.g., a $45.00 cost for eight gutters), and a portion of the approved payment attributable to local taxes ($3.00). Response 410 may also include, within corresponding ones of the message fields, exception data 416 characterizing one or more exceptions associated with the second order, such as products returned to merchant 111 unused, or defective products for which payment is withheld (e.g., information that identifies the modified quantity of eight gutters and the two gutters not accepted by user 101), and causal data 418 characterizing a rationale or cause for the exception, such as the comments provided by user 101 characterizing the reason for changing the purchase or providing a partial payment (e.g., "Original quantity no longer needed"). In some instances, executed RTP module 358 may perform operations that cause client device 102 to transmit response 410 across network 120 to FI computing system 130, e.g., contemporaneously with the partial approval of the requested $60.00 payment by user 101.

As illustrated in FIG. 4A, a programmatic interface established with and maintained by FI computing system 130, such as application programming interface (API) 420 associated RTP engine 152, may receive responses 402 and 410, and may perform operations that cause FI computing system 130 to execute RTP engine 152 (e.g., through a generation of a programmatic command, etc.). Upon execution by the one or more processors of FI computing system 130, executed RTP engine 152 may access elements of field mapping data 404 (e.g., as maintained within data repository 134), may perform operations, described herein, to decompose the message fields of responses 402 and 410 and to generate corresponding elements of decomposed response data 422 and 424, which executed RTP engine 152 may store within a corresponding portion of data repository 134, e.g., within remittance data store 144.

For example, the elements of decomposed response data 422 may include RFP identifier 406, and elements of advice data 408 that identify the total amount of the approved payment (e.g., the approved $5,300.00 payment), those portions of the approved payment associated with each of the purchased products (e.g., the $1,200.00 cost for the purchased sheets of plywood, the $700.00 cost of the purchased roof underlayment, the $3,100.00 cost of the bundles of roof shingles), and a portion of the approved payment attributable to local taxes ($300.00). Further, in some examples, the elements of decomposed response data 422 may include RFP identifier 412, advice data 414 that characterizes, among other things, the total amount of the approved payment (e.g., $48.00 updated costs), those portions of approved payment associated with each of the purchased products (e.g., a $45.00 cost for eight gutters), and a portion of the approved payment attributable to local taxes ($3.00), exception data 416 characterizing one or more exceptions associated with the second order, such as products returned to merchant 111 unused, or defective products for which payment is withheld (e.g., information that identifies the modified quantity of eight gutters and the two gutters not accepted by user 101), and causal data 418 characterizing a rationale or cause for the exception, such as the comments provided by user 101 characterizing the reason for changing the purchase or providing a partial payment (e.g., "Original quantity no longer needed").

Figure 4B:
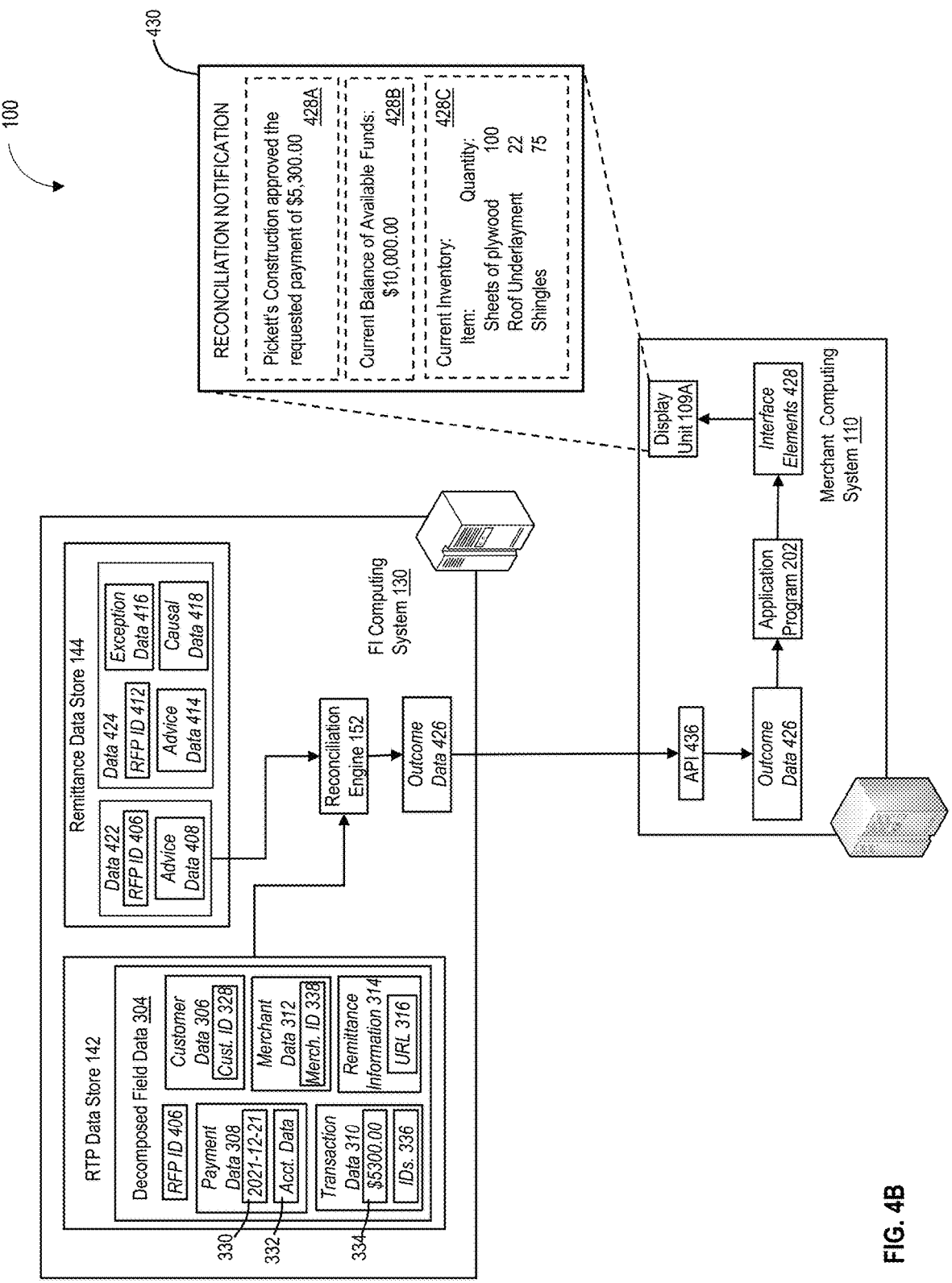

Referring to FIG. 4B, a reconciliation engine 154 executed by the one or more processors of FI computing system 130 may access remittance data store 144 (e.g., as maintained within data repository 134), and may obtain the elements of decomposed response data 422 associated with the now-approved $5,300.00 payment requested from user 101 by merchant 111 for the building supplies. In some instances, executed reconciliation engine 154 may also obtain, from the elements of decomposed response data 422, RFP identifier 406 associated with RFP message 216, and may perform operations that parse the elements of RFP data store 142 and obtained one or more elements of decomposed field data, such as decomposed field data 304, that include RFP identifier 406 and as such, identify and characterize the $5,300.00 payment requested by merchant 111 from user 101 on December $21^{st}$. In some examples, based on portions of advice data 408, executed reconciliation engine 154 may confirm that user 101 approved the full $5,300.00 payment requested by merchant 111, and may perform operations (not illustrated in FIG. 4B) that cause executed RTP engine 152 to execute the now-approved payment from user 101 to merchant 11 in accordance with the elements of decomposed field data 304.

For example, executed RTP engine 152 may access the elements of decomposed field data 304, and may obtain account data 332 that identifies the payment instrument held by user 101 and capable of funding the requested payment (e.g., the account number "XXXX-1234-5678-9012," etc.), and payment amount 334 of the requested payment (e.g., $5,300.00). Executed RTP engine 152 may also perform operations (not illustrated in FIG. 4B) that, in real-time, debit the $5,300.00 payment amount from the account associated with the payment instrument (e.g., the account associated with account number "XXXX-1234-5678-9012"), credit the $5,300.00 payment to the merchant account (the associated with account number "XXXX-9012-3456-7890"), and in some instances, generate one or more additional ISO-20022-compliant RTP messages that confirm the execution of the payment. In some instances, executed RTP engine 152 may perform additional operations (also not illustrated in FIG. 4A) that cause FI computing system 130 to transmit the one or more additional ISO-20022-compliant RTP messages across network 120 to merchant computing system 110, either directly or through one or more of intermediate computing systems 236 associated with participants in the RTP ecosystem, such as, but not limited to, the one or more computing systems associated with the clearinghouse.

Referring back to FIG. 4B, based on portions of advice data 408 and decomposed field data 304, executed reconciliation engine 154 may confirm that user 101 approved the full $5,300.00 payment requested by merchant 111, and may perform operations that reconcile the now-approved and requested payment, both on an aggregate and product-by-product basis, and that generate elements of outcome data 426 that identify and characterize an outcome of the reconciliation process. For example, executed reconciliation engine 154 may access elements 334 of transaction data 310 which identifies the requested $5,300.00 payment amount, and based on portions of advice data 408, confirm that the approved $5,300.00 payment amount is equivalent to the requested payment amount and package information characterizing the successfully reconciled total payment amounts into of outcome data 426

Further, executed reconciliation engine 154 may also obtain additional elements of transaction data 310 that identify those portions of the requested $5,300 payment amount that are attributable to each of the purchased products (e.g., the $1,200.00 cost for the purchased sheets of plywood, the $700.00 cost of the purchased roof underlayment, the $3,100.00 cost of the bundles of roof shingles) to local taxes ($300.00). Based on additional portions of advice data 408, executed reconciliation engine 154 may confirm that the approved portions of the $5,300.00 payment attributable to each of the purchased products and to the local tax are equivalent to corresponding ones of the requested portions, and may perform operations that package information characterizing the successfully reconciled portions of the requested and approved payment amounts into of outcome data 426. In some instances, executed reconciliation engine 154 may also package, into portions of outcome data 426, additional information confirming the successful execution of the real-time payment and indicating a current balance of funds in the merchant account (the associated with account number "XXXX-9012-3456-7890"). In some instances, executed reconciliation engine 154 may perform operations that cause FI computing system 130 to transmit outcome data 426 across network 120 to merchant computing system 110. Further, although not illustrated in FIG. 4B, executed reconciliation engine 154 may also perform operations that access RFP message 216 maintained within RFP message queue 136, and delete RFP message 216 from RFP message queue 136.

A programmatic interface established and maintained by merchant computing system 110, such as an application programming interface (API) 436 associated with application program 202, may receive outcome data 426, and may perform operations that cause merchant computing system 110 to execute application program 202 (e.g., through a generation of a programmatic command, etc.). As described herein, application program 202 may include accounting or inventory-management application, and upon execution by the one or more processors of merchant computing system 110, executed application program 202 (e.g., the executed accounting or inventory-management application) may perform operations that generate and route interface elements 428 representative of portions of outcome data 26 to a display unit 109A of merchant computing system 110. By way of example, display unit 109A may include, but is not limited to, an LCD display unit, a pressure-sensitive touchscreen display unit, or another appropriate type of display unit appropriate to merchant computing system 110. In some instances, when rendered for presentation within a corresponding reconciliation notification interface 430 by display unit 109A, interface elements 428 provide a graphical representation of an outcome of the reconciliation process, the balance of funds in the merchant account, and additionally, or alternatively, a current inventory of available products that reflects the purchase of the plywood, roof underlayment, and shingles.

For example, when rendered for presentation within notification interface 430 by display unit 109A, a subset 428A of interface elements 428 may indicate that user 101 elected to approve the requested payment of $5,300.00. Further, and when rendered for presentation within notification interface 430 by display unit 109A, a subset 428B of interface elements 428 may indicate that the financial services account (e.g., the merchant account held by merchant 111) capable of receiving proceeds from the purchased transaction has been updated to reflect a current balance of available funds of $10,000.00. Further, and when rendered for presentation within notification interface 430 by display unit 109A, a subset 428C of interface elements 428 may indicate the current inventory (e.g., 100 sheets of plywood, twenty-two rolls of roof underlayment, seventy-five bundles of shingles, etc.) of products.

Figure 4C:
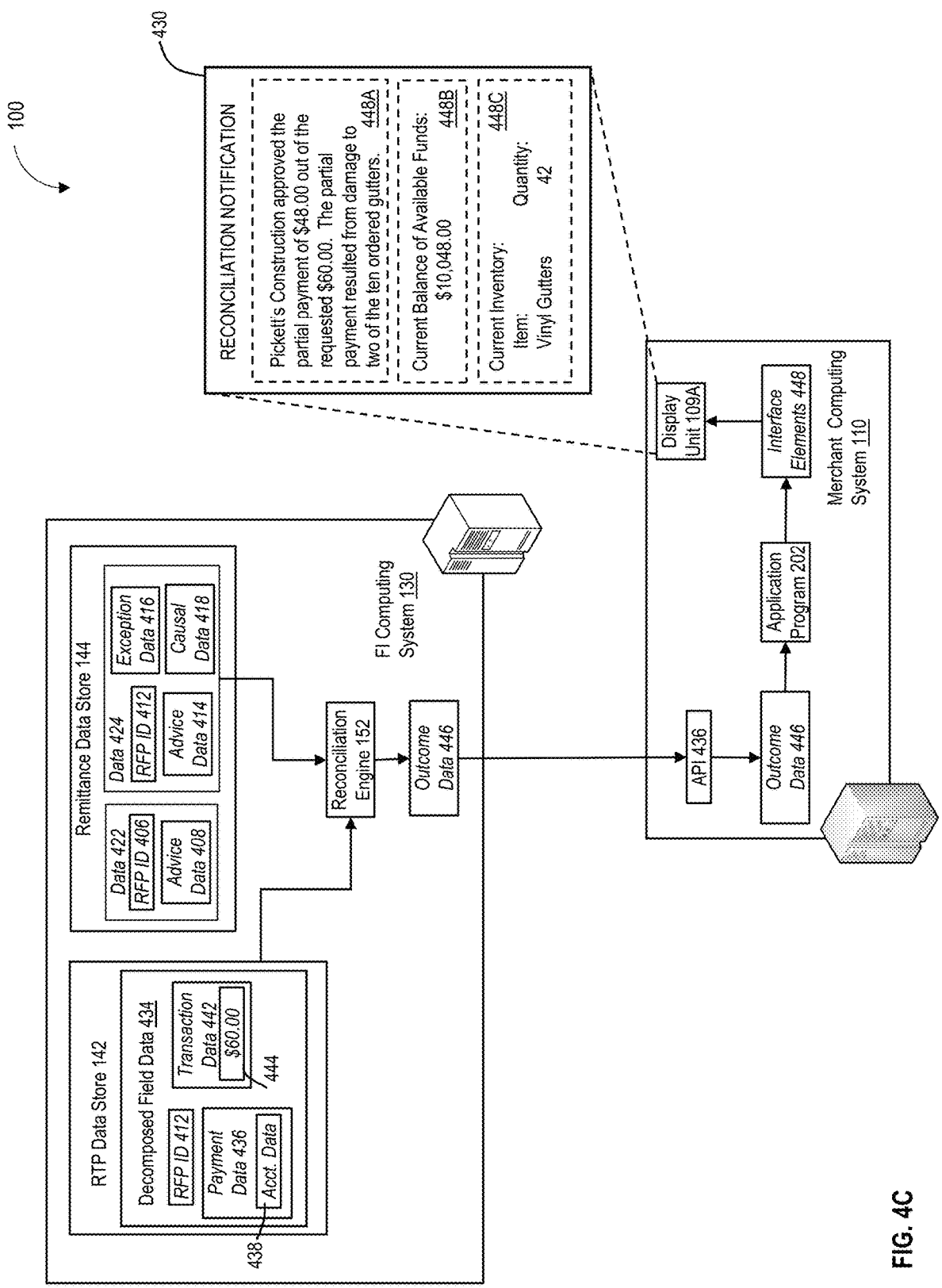

Referring to FIG. 4C, executed reconciliation engine 154 may obtain, from remittance data store 144, the elements of decomposed response data 424 associated with the partially approved $60.00 payment requested from user 101 by merchant 111 for the vinyl gutters. In some instances, executed reconciliation engine 154 may also obtain, from the elements of decomposed response data 424, RFP identifier 412 associated with the second RFP message, and may perform operations that parse the elements of RFP data store 142 and obtained one or more elements of decomposed field data, such as decomposed field data 434, that include RFP identifier 412 and as such, identify and characterize the $60.00 payment requested by merchant 111 from user 101 for the ten vinyl gutters on December $28^{th}$. In some examples, based on portions of advice data 414, executed reconciliation engine 154 may confirm that user 101 approved a partial payment of $48.00 payment requested by merchant 111, and may perform operations (not illustrated in FIG. 4B) that cause executed RTP engine 152 to execute the approved partial payment from user 101 to merchant 111 in accordance with the elements of decomposed field data 432.

For example, executed RTP engine 152 may access the elements of decomposed field data 434, and may obtain account data 438 that identifies the payment instrument held by user 101 and capable of funding the requested payment (e.g., the account number "XXXX-1234-5678-9012") and the merchant account (the associated with account number "XXXX-9012-3456-7890"), and may obtain transaction data 444 that identified the requested, $60.00 payment. Executed RTP engine 152 may also obtain the $48.00 partial payment from advice data 414. Executed RTP engine 152 may also perform operations (not illustrated in FIG. 4B) that, in real-time, debit the $48.00 payment amount from the account associated with the payment instrument (e.g., the account associated with account number "XXXX-1234-5678-9012"), credit the $48.00.00 payment to the merchant account (the associated with account number "XXXX-9012-3456-7890"), and in some instances, generate one or more additional ISO-20022-compliant RTP messages that confirm the execution of the payment. In some instances, executed RTP engine 152 may perform additional operations (also not illustrated in FIG. 4C) that cause FI computing system 130 to transmit the one or more additional ISO-20022-compliant RTP messages across network 120 to merchant computing system 110, either directly or through one or more of intermediate computing systems 236 associated with participants in the RTP ecosystem, such as, but not limited to, the one or more computing systems associated with the clearinghouse.

Referring back to FIG. 4C, based on portions of advice data 414 and decomposed field data 434, executed reconciliation engine 154 may confirm that user 101 approved only a $48.00 portion of the requested $60.00 payment, that generate elements of outcome data 446 that identify and characterize the discrepancy between the requested and approved payment amounts. Executed reconciliation engine 154 may parse the elements of exception data 416, which specify that user 101 reduced the initial ten-gutter order by two vinyl gutters, and causal data 418 indicating that the reduction resulted from visible damage on two of the ten vinyl gutters, and may package portions of exception data 416 and causal data 418 into corresponding portions of outcome data 438. In some instances, executed reconciliation engine 154 may also package, into portions of outcome data 438, additional information confirming the successful execution of the partial, real-time payment and indicating a current balance of funds in the merchant account (the associated with account number "XXXX-9012-3456-7890"), and may perform operations that cause FI computing system 130 to transmit outcome data 446 across network 120 to merchant computing system 110. Further, although not illustrated in FIG. 4B, executed reconciliation engine 154 may also perform operations that access the second RFP maintained within RFP message queue 136, and delete the second RFP message from RFP message queue 136.

API 420 may receive outcome data 446 and provide outcome data 446 as an input to executed application program 202, which may perform any of the exemplary processes described herein to generate and route interface elements 448 representative of portions of outcome data 446 to display unit 109A of merchant computing system 110. In some instances, when rendered for presentation within a corresponding reconciliation notification interface 430 by display unit 109A, interface elements 448 provide a graphical representation of an outcome of the reconciliation process and the discrepancy between the approved and requested payments, the balance of funds in the merchant account, and additionally, or alternatively, a current inventory of available products that reflects the purchase of the plywood, roof underlayment, and shingles.

For example, when rendered for presentation within notification interface 430 by display unit 109A, a subset 448A of interface elements 428 may indicate that user 101 elected to approve the $48.00 portion of the $60.00 requested payment, and that discrepancy results from a presence of visible damage in two of the ten ordered vinyl gutters. Further, and when rendered for presentation within notification interface 430 by display unit 109A, a subset 448B of interface elements 448 may indicate that the financial services account (e.g., the merchant account held by merchant 111) capable of receiving proceeds from the purchased transaction has been updated to reflect a current balance of available funds of $10,048.00. When rendered for presentation within notification interface 430 by display unit 109A, a subset 448C of interface elements 448 may indicate the current inventory (e.g., forty-two vinyl gutters, etc.) of products.

Figure 5:
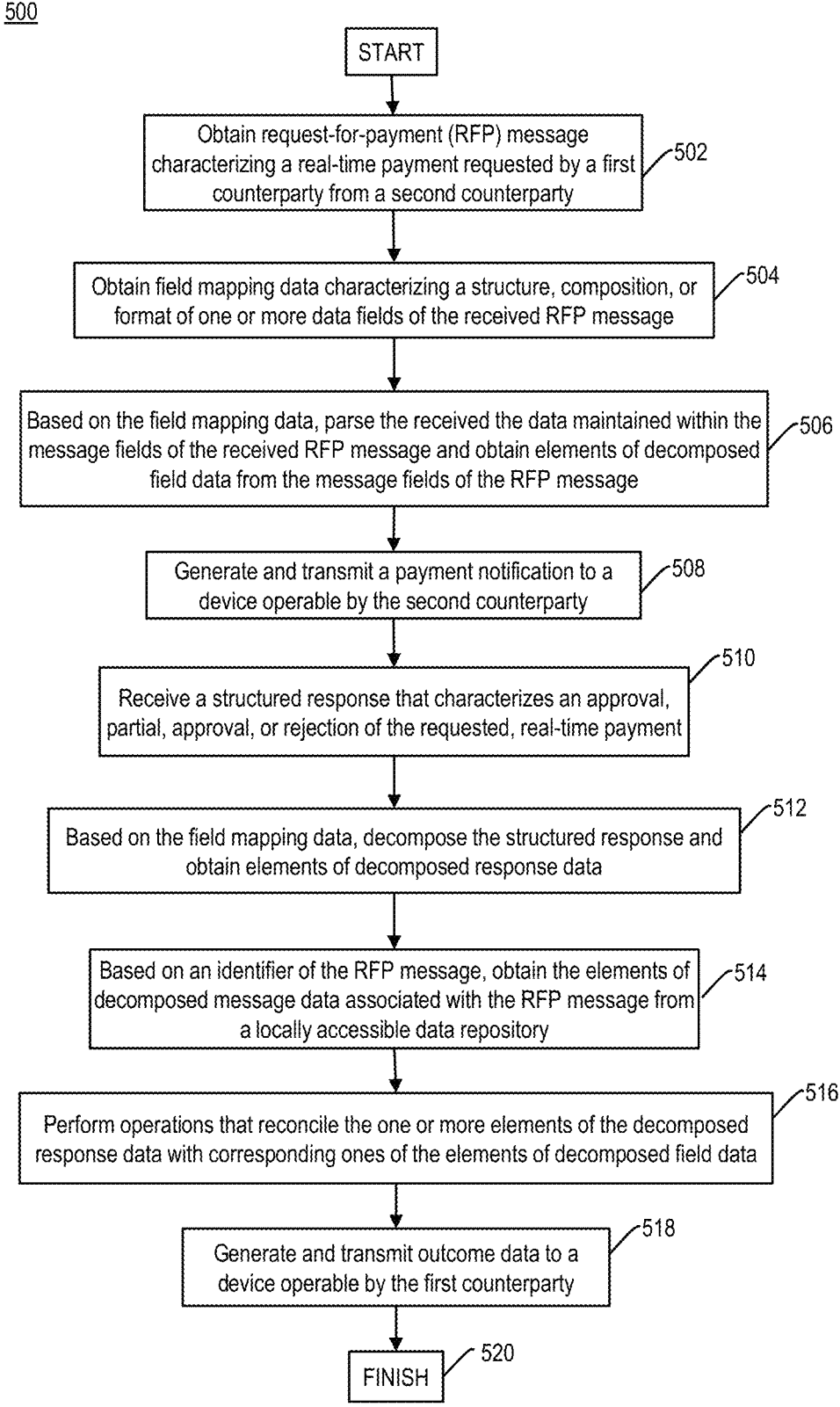
FIG. 5 is a flowchart of an exemplary process 500 for performing reconciliation processing in real-time based on structured messaging data, in accordance with some exemplary embodiments.

FIG. 5 is a flowchart of an exemplary process 500 for performing reconciliation processing in real-time based on structured messaging data, in accordance with some exemplary embodiments. For example, one or more computing systems associated with a financial institution, such as FI computing system 130, may perform one or more of the steps of exemplary process 500, as described below in reference to FIG. 5. Referring to FIG. 5, FI computing system 130 may perform any of the processes described herein to obtain a RFP message associated with the initiated exchange of data (e.g., in step 502 of FIG. 5). As described herein, the data exchange may include, but is not limited to, a purchase transaction initiated between a first counterparty (e.g., a merchant, such as merchant 111 associated with merchant computing system 110) and a second counterparty (e.g., a customer of the merchant, such as user 101 associated with client device 102), and the purchase transaction may involve, or be associated with one or more products or services provisioned by the first counterparty to the second counterparty (e.g., the exemplary building materials described herein, etc.). Further, the obtained RFP message may identify and characterize a real-time payment requested from the second party by the first party.

In some examples, FI computing system 130 may obtain the RFP message from a corresponding message queue, such as RFP message queue 136, although in other examples, FI computing system 130 may receive the RFP message from merchant computing system 110 across a corresponding communications network (e.g., network 120), either directly or from one or more intermediate computing systems 236, such as, but not limited to, a computing system associated with the financial institution of merchant 111 or one or more computing systems of a clearinghouse associated with the RTP ecosystem. FI computing system 130 may also store the received RFP message within a corresponding portion of locally accessible data repository, such as within RFP message queue 136 of data repository 134.

As described herein, the received RFP message may include message fields consistent with the ISO 20022 standard for electronic data exchange between financial institutions, and each of the message fields may be populated with data structured and formatted in accordance with the ISO 20022 standard. By way of example, the received, ISO-20022-compliant RFP message may include, among other things: (i) message fields populated with data specifying a full name and postal address of user 101; (ii) message fields populated with data identifying a payment instrument selected by user 101 to fund the initiated purchase transaction; (iii) message fields populated with data specifying a name and postal address of merchant 111; (iv) message fields populated with data identifying a financial services account held by merchant 111 and available to receive processed from the requested payment; and (v) message fields populated with one or more parameter values that characterize the purchase transaction, a requested payment method, and/or a requested payment date. Further, and as described herein, the received, ISO-20022-compliant RFP message may also include structured or unstructured message fields that specify additional remittance information associated with the purchase transaction, and examples of the additional remittance information include, but are not limited to, information identifying a product or service involved in the purchase transaction, or a link to remittance data associated with the initiated transaction (e.g., a long-form URL or shortened to a PDF or HTML invoice, as described herein).

Referring back to FIG. 5, FI computing system 130 may obtain, from the locally accessible data repository, one or more elements of field mapping data that characterize a structure, composition, or format of one or more data fields of the received RFP message (e.g., in step 504 of FIG. 5). Based on the obtained elements of the field mapping data, FI computing system 130 may perform any of the exemplary processes described herein to parse the data maintained within the message fields of the received RFP message, and to obtain elements of decomposed field data that identify and characterize user 101, merchant 111, the purchase transaction, and the payment requested from user 101 by merchant 111 for the purchased products or services (e.g., in step 506 of FIG. 5). For example, the elements of decomposed field data may include, but are not limited to, a unique identifier of the RFP message, customer data that identifies a full name or address of user 101, payment data that identifies a requested payment date or a payment instrument selected by user 101 to fund the purchase transaction, transaction data that identifies a requested payment amount or a requested payment currency, and merchant data that includes a name of merchant 111, a postal address associated with merchant 111, or information identifying a merchant account capable of receiving proceeds from the purchased transaction. Further, and as described herein, the elements of decomposed field data may also include additional elements of structured or unstructured remittance data, such as, but not limited to, a long-form URL or a shortened URL that point to elements of formatted receipt data (e.g., in PDF or HTML form) associated with the initiated purchase transaction and maintained at one or more additional computing systems, such as merchant computing system 110. In some instances, FI computing system 130 may store the elements of decomposed field data within a portion of the locally accessible data repository, e.g., within RTP data store 142 of data repository 134 (e.g., also in step 506 of FIG. 5).

FI computing system 130 may perform any of the exemplary processes described herein to generate one or more elements of a payment notification associated with the queued RFP message based on all, or a selected portion, of the decomposed field data (e.g., in step 508 of FIG. 5). By way of example, and as described herein, the payment notification may be associated with the requested payment, and that payment notification may include, among other things, the full name of user 101, the requested payment date, information identifying the selected payment instrument, information identifying merchant 111, information identifying the products or services associated with, or involved in, the purchase transaction. Further, in some examples, the payment notification may also include digital content that, when presented on a digital interface generated by an application program executed at client device (e.g., mobile banking application 108 of client device 102 of FIG. 1, etc.) of a party to the initiated transaction (e.g., user 101), prompt user 101 to provide input to client device 102 that approves, partially approves, or alternatively, declines, the real-time payment requested from user 101 by merchant 111.

Further, and as illustrated in FIG. 5, FI computing system 130 may receive a structured response from client device 102 that characterizes an approval, partial approval, or rejection of the requested, real-time payment associated with the RFP message (e.g., in step 510 of FIG. 5). As described herein, the response may include message fields structured in accordance with one or more standardized data-exchange protocols, such as the ISO 20022 standard for electronic data exchange between financial institutions, and the message may include an identifier of the RFP message, advice data characterizing the approved payment, both on an aggregate and on a product-by-product basis. Further, in some instances, the message fields of the response may also include information characterizing one or more exceptions and causes for the exceptions such as products returned to the business-banking customer or defective products for which payment is withheld. Based on the one or more elements of field mapping data, or on additional, or alternate, elements of field mapping data, FI computing system 130 may perform any of the exemplary processes described herein to decompose the structured response and obtain elements of decomposed response data (e.g., in step 512 of FIG. 5).

In some instances, FI computing system 130 may obtain the unique identifier of the RFP message from the decomposed response data, and based on the unique identifier, obtain the elements of decomposed message data associated with the RFP message from the locally accessible data repository (e.g., in step 514 of FIG. 5). FI computing system 130 may perform any of the exemplary processes described herein to reconcile the one or more elements of the decomposed response data with corresponding ones of the elements of decomposed field data associated with the RFP message (e.g., in step 516 of FIG. 5). By way of example, FI computing system 130 may perform any of the exemplary processes described herein to reconcile, on an aggregate or product-by-product basis, the payment requested by the first counterparty (e.g., merchant 111) a corresponding payment approved, approved partially, or rejected by the second counterparty (e.g., user 101). FI computing system 130 may also perform any of the exemplary processes described herein to generate data indicative of an outcome of the reconciliation process, and to transmit the outcome data across network 120 to a device operable by the first counterparty (e.g., in step 518 of FIG. 5). By way of example, in step 518, FI computing system 130 may also perform operations that establish a secure channel of communications with a programmatic interface of an application program executed at the device of the first counterparty, such as an accounting or inventory management application, and the executed accounting or inventory management application may render portions of the outcome data for presentation within a corresponding digital interface. Exemplary process 500 may then be complete in step 522.

C. Exemplary Hardware and Software Implementations

Embodiments of the subject matter and the functional operations described in this disclosure can be implemented in digital electronic circuitry, in tangibly-embodied computer software or firmware, in computer hardware, including the structures disclosed in this specification and their structural equivalents, or in combinations of one or more of them. Embodiments of the subject matter described in this disclosure, including web browser 106, mobile banking application 108, decomposition engine 146, analytical engine 148, notification engine 150, RTP engine 152, reconciliation engine 154, application program 202, RTP engine 214, application programming interfaces (APIs) 302, 346, and 436, URL processing module 318, remittance analysis module 322, notification module 348, interface element generation module 350, and RTP module 358, can be implemented as one or more computer programs, i.e., one or more modules of computer program instructions encoded on a tangible non-transitory program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, an application program, an engine, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (AGPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, such as user 101, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the disclosure or of what may be claimed, but rather as descriptions of features specific to particular embodiments of the disclosure. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship. In this disclosure, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

The foregoing is provided for purposes of illustrating, explaining, and describing embodiments of this disclosure. Modifications and adaptations to the embodiments will be apparent to those skilled in the art and may be made without departing from the scope or spirit of the disclosure.

What is claimed is:

1. An apparatus comprising:
   a communications interface communicatively coupled to a network;
   a memory storing instructions; and
   at least one processor coupled to the communications interface and to the memory, the at least one processor being configured to execute the instructions to:
   obtain elements of decomposed message data, the elements of decomposed message data comprising a first value of a parameter of an exchange of data involving a first device operable by a first counterparty and a second device operable by a second counterparty, and the elements of decomposed message data characterizing a real-time payment requested from the second counterparty by the first counterparty;
   transmit, across the network via the communications interface, a notification associated with the data exchange to the second device operable by the second counterparty, the notification comprising at least the first parameter value, and the notification causing a first application program executed at the second device to present at least the first parameter value within a first digital interface;
   receive, across the network via the communications interface, a response to the notification from the second device, the response comprising message fields that include a modification to the first parameter value, and the message fields of the response being structured in accordance with a standardized data-exchange protocol;
   obtain, from the memory, mapping data associated with message fields of the response, and based on the mapping data, perform operations that obtain exception data and causal data from the message fields of the response, the exception data characterizing the modification to the first parameter value of the data exchange by the second device, and the causal data characterizing a rationale for the modification;
   modify the first parameter value in accordance with the exception data, determine a second value of the parameter of the data exchange based on the modified first parameter value, and perform operations that execute the data exchange in accordance with at least the second parameter value;
   based on at least the modified first parameter value and the second parameter value, perform operations that reconcile the response with the elements of decomposed message data, and generate elements of outcome data characterizing an outcome of the reconciliation of the response with the elements of decomposed message data, the outcome data comprising at least a portion of the causal data;
   obtain, from the memory, elements of counterparty data associated with the first counterparty, and modify at least one of the elements of counterparty data in accordance with the outcome data; and
   transmit, across the network via the communications interface, the outcome data indicative of the outcome of the reconciliation to the first device operable by the first counterparty, the outcome data causing the first device to execute a second application program that presents at least a portion of the causal data within a second digital interface.

2. The apparatus of claim 1, wherein:
   the response comprises elements of response data disposed within corresponding message fields; and
   the at least one processor is further configured to execute the instructions to
   perform operations that obtain the elements of response data from the message fields based on the mapping data, the elements of response data comprising the exception data and the causal data; and
   obtain the modification to at least the first parameter value from the exception data.

3. The apparatus of claim 2, wherein the at least one processor is further configured to execute the instructions to:
   determine that the second parameter value is inconsistent with the first parameter value;
   perform operations that obtain, from the elements of response data, information characterizing the determined inconsistency between the first and second parameter values; and
   generate the outcome data based on the obtained information, the first device being further configured to present at least a portion of the outcome data within the second digital interface.

4. The apparatus of claim 1, wherein the at least one processor is further configured to execute the instructions to:

perform operations that obtain an identifier associated with the elements of decomposed message data from the message fields of the response based on the mapping data; and based on the identifier, load the elements of decomposed message data from the memory.

5. The apparatus of claim 1, wherein the at least one processor is further configured to execute the instructions to:
perform operations that establish a secure channel of communications with the second application program executed at the first device; and
transmit, via the communications interface, the outcome data to the first device across the secure channel of communications.

6. The apparatus of claim 1, wherein the at least one processor is further configured to execute the instructions to receive, via the communications interface, a message associated with the exchange of data involving the first and second counterparties, the message comprising elements of message data disposed within corresponding message fields.

7. The apparatus of claim 6, wherein the at least one processor is further configured to execute the instructions to:
perform operations that obtain the elements of decomposed message data from corresponding ones of the message fields based on the mapping data; and
store the elements of decomposed message data within the memory, the elements of decomposed message data comprising an identifier of the message.

8. The apparatus of claim 7, wherein:
the message fields of the received message are structured in accordance with a standardized data-exchange protocol; and
elements of the mapping data identify corresponding ones of the elements of the message data and corresponding ones of the message fields.

9. The apparatus of claim 1, wherein:
the first parameter value comprises a requested payment amount associated with the real-time payment, and the notification includes the requested payment amount;
the second parameter value comprises an approved payment amount; and
the at least one processor is further configured to execute the instructions to perform the operations that reconcile the response with the elements of decomposed message data based on the requested payment amount and the approved payment amount.

10. The apparatus of claim 1, wherein:
the elements of decomposed message data further comprise a uniform resource locator associated with formatted data maintained by a computing system; and
the at least one processor is further configured to execute the instructions to:
perform operations, based on the uniform resource locator, that request and receive, via the communications interface, at least a portion of the formatted data from the computing system via the communications interface;
perform additional operations that execute the modified data exchange in accordance with at least the second parameter value and the portion of the formatted data; and
based on at least the first and second parameter values, and based on the portion of the formatted data, perform operations that reconcile the response with the elements of decomposed message data.

11. The apparatus of claim 1, wherein the at least one processor is further configured to execute the instructions to:
receive, across a first communications channel via the communications interface, a message associated with the exchange of data involving the first and second devices, the message comprising elements of message data disposed within corresponding message fields, and the first communications channel being established across the network between the apparatus and the first device associated with the first counterparty;
perform operations that obtain the elements of decomposed message data from corresponding ones of the message fields based on the mapping data;
transmit, across a second communications channel via the communications interface, the notification associated with the data exchange to the second device, the second communications channel being established across the network between the apparatus and the first application program executed at the second device;
receive the response to the notification from the second device across the second communications channel via the communications interface; and
transmit the outcome data to the first device across a third communications channel via the communications interface, the third communications channel being established across the network between the apparatus and the second application program executed at the first device.

12. The apparatus of claim 11, wherein the message fields of the message and the message fields of the response are each structured in accordance with a standardized data-exchange protocol.

13. The apparatus of claim 1, wherein:
the modification to the at least one of the elements of counterparty data characterizes an impact of the modification to the first parameter value on the at least one of the elements of counterparty data;
the at least one processor is further configured to execute the instructions to transmit, across the network via the second device, information comprising the modification to the at least one of the elements of counterparty data to the first device; and
the executed second application program causes the first device to present, within the second digital interface, a graphical representation of the modification to the first parameter value.

14. The apparatus of claim 1, wherein:
the at least one processor is further configured to execute the instructions to:
receive, across the network via the communications interface, a message associated with the exchange of data involving the first and second counterparties, the message being structured in accordance with a standardized data-exchange protocol;
based on the mapping data, obtain the elements of decomposed message data from corresponding message fields of the received message, the elements of decomposed message data comprising a first message identifier and the first parameter value; and
store the first message identifier and the first parameter value within a first portion of the memory;
the response to the notification is structured in accordance with the standardized data-exchange protocol and comprises a second message identifier; and
the at least one processor is further configured to execute the instructions to:
store the second message identifier, the exception data, and the causal data within a second portion of the memory; and perform operations that obtain the first parameter value from the first portion of the memory based on the first message identifier, and that obtain the exception data and the causal data from the second portion of the memory based on the second message identifier.

15. A computer-implemented method, comprising:

obtaining elements of decomposed message data using at least one processor, the elements of decomposed message data comprising a first value of a parameter of an exchange of data involving a first device operable by a first counterparty and a second device operable by second counterparty, and the elements of decomposed message data characterizing a real-time payment requested from the second counterparty by the first counterparty;

using the at least one processor, transmitting, across a network, a notification associated with the data exchange to the second device operable by the second counterparty, the notification comprising at least the first parameter value, and the notification causing a first application program executed at the first device to present at least the first parameter value within a first digital interface;

using the at least one processor, receiving a response to the notification from the second device across the network, the response comprising message fields that include a modification to the first parameter value, and the message fields of the response being structured in accordance with a standardized data-exchange protocol;

obtaining, using the at least one processor, mapping data associated with message fields of the response, and based on the mapping data, performing operations, using the at least one processor, that obtain exception data and causal data from the message fields of the response, the exception data characterizing the modification to the first parameter value of the data exchange by the second device, and the causal data characterizing a rationale for the modification;

modifying, using the at least one processor, the first parameter value in accordance with the exception data, determining, using the at least one processor, a second value of the parameter of the data exchange based on the at least the modified first parameter value, and performing operations, using the at least one processor, that execute the modified data exchange in accordance with at least the second parameter value;

based on at least the modified first parameter value and the second parameter value, performing operations, using the at least one processor, that reconcile the response with the elements of decomposed message data, and generating, using the at least one processor, elements of outcome data characterizing an outcome of the reconciliation of the response with the elements of decomposed message data, the outcome data comprising at least a portion of the causal data;

using the at least one processor, obtaining elements of counterparty data associated with the first counterparty from a data repository, and modifying at least one of the elements of counterparty data in accordance with the outcome data; and transmitting, across the network, and using the at least one processor, the outcome data indicative of the outcome of the reconciliation to the first device operable by the first counterparty, the outcome data causing the first device to execute a second application program that presents at least a portion of the causal data within a second digital interface.

16. The computer-implemented method of claim 15, wherein:

the response comprises elements of response data disposed within corresponding message fields; and the computer-implemented method further comprises:

performing operations, using the at least one processor, that obtain the elements of response data from the message fields based on the mapping data, the elements of response data comprising the exception data and the causal data; and obtaining the modification to the first parameter value from the exception data.

17. The computer-implemented method of claim 15, further comprising:

determining, using the at least one processor, that the second parameter value is inconsistent with the first parameter value;

using the at least one processor, performing operations that obtain, from the elements of response data, information characterizing the determined inconsistency between the first and second parameter values; and generating, using the at least one processor, the outcome data based on the obtained information, the first device being further configured to present at least a portion of the outcome data within the second digital interface.

18. The computer-implemented method of claim 15, further comprising:

obtaining, using the at least one processor, an identifier associated with the elements of decomposed message data from the message fields of the response based on the mapping data; and based on the identifier, and using the at least one processor, obtaining the elements of decomposed message data from a data repository.

19. The computer-implemented method of claim 15, wherein:

the computer-implemented method further comprises performing operations, operations using the at least one processor, that establish a secure channel of communications with the second application program executed at the first device; and the transmitting comprises transmitting the outcome data to the first device across the secure channel of communications.

20. The computer-implemented method of claim 15, further comprising:

receiving, operations using the at least one processor, a message associated with the exchange of data involving the first and second devices, the message comprising elements of message data disposed within corresponding message fields;

obtaining, using the at least one processor, mapping data associated with the message fields of the message from a data repository;

performing operations, using the at least one processor, that obtain the elements of decomposed message data from corresponding ones of the message fields based on the mapping data; and storing, using the at least one processor, the elements of decomposed message data within the data repository, the elements of decomposed message data comprising an identifier of the message.

21. The computer-implemented method of claim 20, wherein:

the message fields of the received message are structured in accordance with a standardized data-exchange protocol; and elements of the mapping data identify corresponding ones of the elements of the message data and corresponding ones of the message fields.

22. The computer-implemented method of claim 15, wherein:

the first parameter value comprises a requested payment amount associated with the real-time payment, and the notification includes the requested payment amount;

the second parameter value comprises an approved payment amount; and the computer-implemented method further comprises performing operations using the at least one processor that reconcile the response with the elements of decomposed message data based on the requested payment amount and the approved payment amount.

23. A tangible, non-transitory computer-readable medium storing instructions that, when executed by at least one processor, cause the at least one processor to perform a method, comprising:

obtaining elements of decomposed message data, the elements of decomposed message data comprising a first value of a parameter of an exchange of data involving a first device operable by a first counterparty and a second device operable by a second counterparty, and the elements of decomposed message data characterizing a real-time payment requested from the second counterparty by the first counterparty;

transmitting, across a network, a notification associated with the data exchange to the second device operable by the second counterparty, the notification comprising at least the first parameter value, and the notification causing a first application program executed at the second device to present at least the first parameter within a first digital interface;

receiving a response to the notification from the first device across the network, the response comprising message fields that include a modification to the first parameter value, and the message fields of the response being structured in accordance with a standardized data-exchange protocol;

obtaining mapping data associated with message fields of the response, and based on the mapping data, performing operations that obtain exception data and causal data from the message fields of the response, the exception data characterizing the modification to the first parameter value of the data exchange by the second device, and the causal data characterizing a rationale for the modification;

modifying the first parameter value in accordance with the exception data, determining a second value of the parameter of the data exchange based on at least the modified first parameter value and performing operations, using the at least one processor, that execute the data exchange in accordance with at least the second parameter value;

based on at least the first and second parameter values, performing operations that reconcile the response with the elements of decomposed message data, and generating elements of outcome data characterizing an outcome of the reconciliation of the response with the elements of decomposed message data, the outcome data comprising at least a portion of the causal data;

obtaining elements of counterparty data associated with the first counterparty from a data repository, and modifying at least one of the elements of counterparty data in accordance with the outcome data; and transmitting, across the network, the outcome data indicative of the outcome of the reconciliation to the first device operable by the first counterparty, the outcome data causing the first device to execute a second application program that presents at least a portion of the causal data within a second digital interface.

* * * * *